(12) United States Patent
Baba et al.

(10) Patent No.: US 7,827,331 B2
(45) Date of Patent: Nov. 2, 2010

(54) IO ADAPTER AND DATA TRANSFERRING METHOD USING THE SAME

(75) Inventors: Takashige Baba, Kodaira (JP); Yoshiko Yasuda, Tokorozawa (JP); Jun Okitsu, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/831,097

(22) Filed: Jul. 31, 2007

(65) Prior Publication Data
US 2008/0140877 A1  Jun. 12, 2008

(30) Foreign Application Priority Data

Dec. 6, 2006 (JP) .............................. 2006-328934
Jun. 1, 2007 (JP) .............................. 2007-146429

(51) Int. Cl.
*G06F 13/28* (2006.01)
*G06F 13/12* (2006.01)
*G06F 13/38* (2006.01)

(52) U.S. Cl. .............................. 710/72; 710/22; 710/23; 710/24; 710/25; 710/26; 710/27; 710/28

(58) Field of Classification Search ............. 710/22–28, 710/72

See application file for complete search history.

(56) References Cited

U.S. PATENT DOCUMENTS 5,136,582 A * 8/1992  Firoozmand ................ 370/400
5,249,265 A * 9/1993  Liang ......................... 715/853
6,026,443 A * 2/2000  Oskouy et al. ............... 709/230
6,295,553 B1 * 9/2001  Gilbertson et al. .......... 709/207
6,327,615 B1 * 12/2001 Kasper ....................... 709/213
6,381,656 B1 * 4/2002  Shankman ................... 710/18
6,912,217 B1 * 6/2005  Vogel ......................... 370/389
6,961,941 B1 * 11/2005 Nelson et al. ............... 719/319

FOREIGN PATENT DOCUMENTS

JP         2002-183078         6/2002

* cited by examiner

*Primary Examiner*—Henry W Tsai
*Assistant Examiner*—Eric T Oberly
(74) *Attorney, Agent, or Firm*—Brundidge & Stanger, P.C.

(57) ABSTRACT

An IO adapter for guaranteeing the data transfer bandwidth on each capsule interface when multiple capsule interfaces jointly share the DMA engine of the IO adapter. An IO driver containing a capsule interface information table including bandwidth information and for setting the forming status of a pair of capsule interfaces and, during data transfer subdivides the descriptors for the capsule interfaces into multiple groups for each data buffer size satisfying the preset bandwidth information and, copies one group at each fixed sample time set by the descriptor registration means, into the descriptor ring and performs DMA transfer. To control this copy information, the IO driver contains a ring scheduler information table for managing the number of descriptor entries for the capsule interface cycle time and, a ring scheduler cancel means for renewing the entries in the ring scheduler information table each time one transmission of the descriptor group ends.

13 Claims, 19 Drawing Sheets

| KI IDENTIFIER | BANDWIDTH |
|---|---|
| KI1 | 10MB/s |
| KI2 | 50MB/s |
| KI3 | 500MB/s |
| ⋮ | ⋮ |

K301 · K302 · FT3

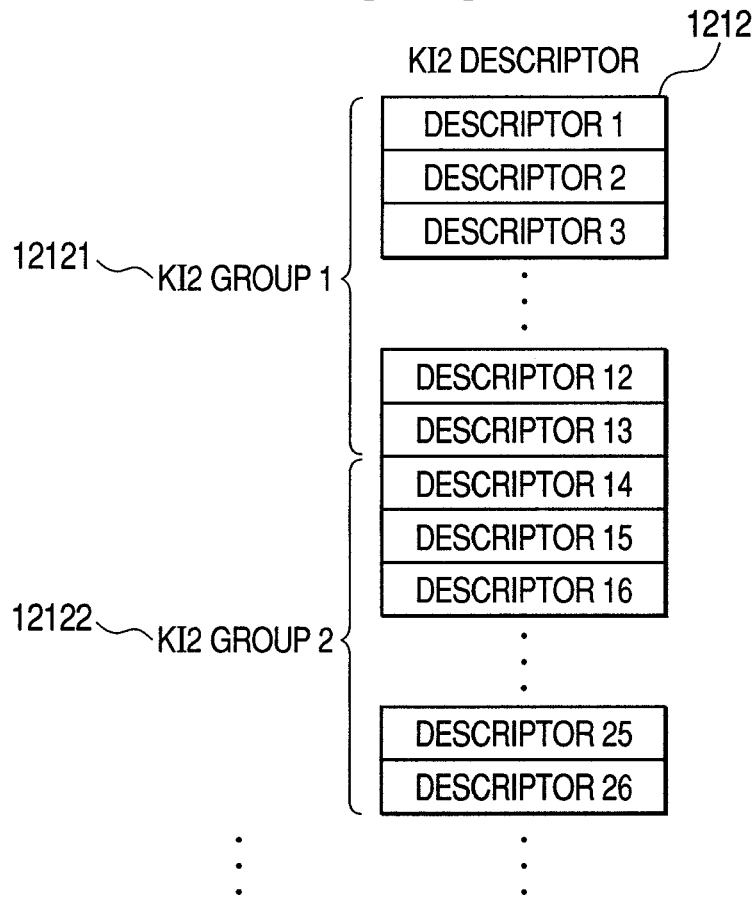

FIG. 7

| TIME CYCLE | KI IDENTIFIER | | ... |
| --- | --- | --- | --- |
| | KI1 | KI2 | ... |
| t1 | 3 | 13 | |
| t2 | 3 | 13 | |
| t3 | 3 | 13 | |
| t4 | 3 | 0 | |
| ⋮ | ⋮ | ⋮ | |

FIG. 8

| TIME CYCLE | KI IDENTIFIER | | ... |
| --- | --- | --- | --- |
| | KI1 | KI2 | ... |
| t1 | 0 | 13 | |
| t2 | 3 | 13 | |
| t3 | 3 | 13 | |
| t4 | 3 | 0 | |
| ⋮ | ⋮ | ⋮ | |

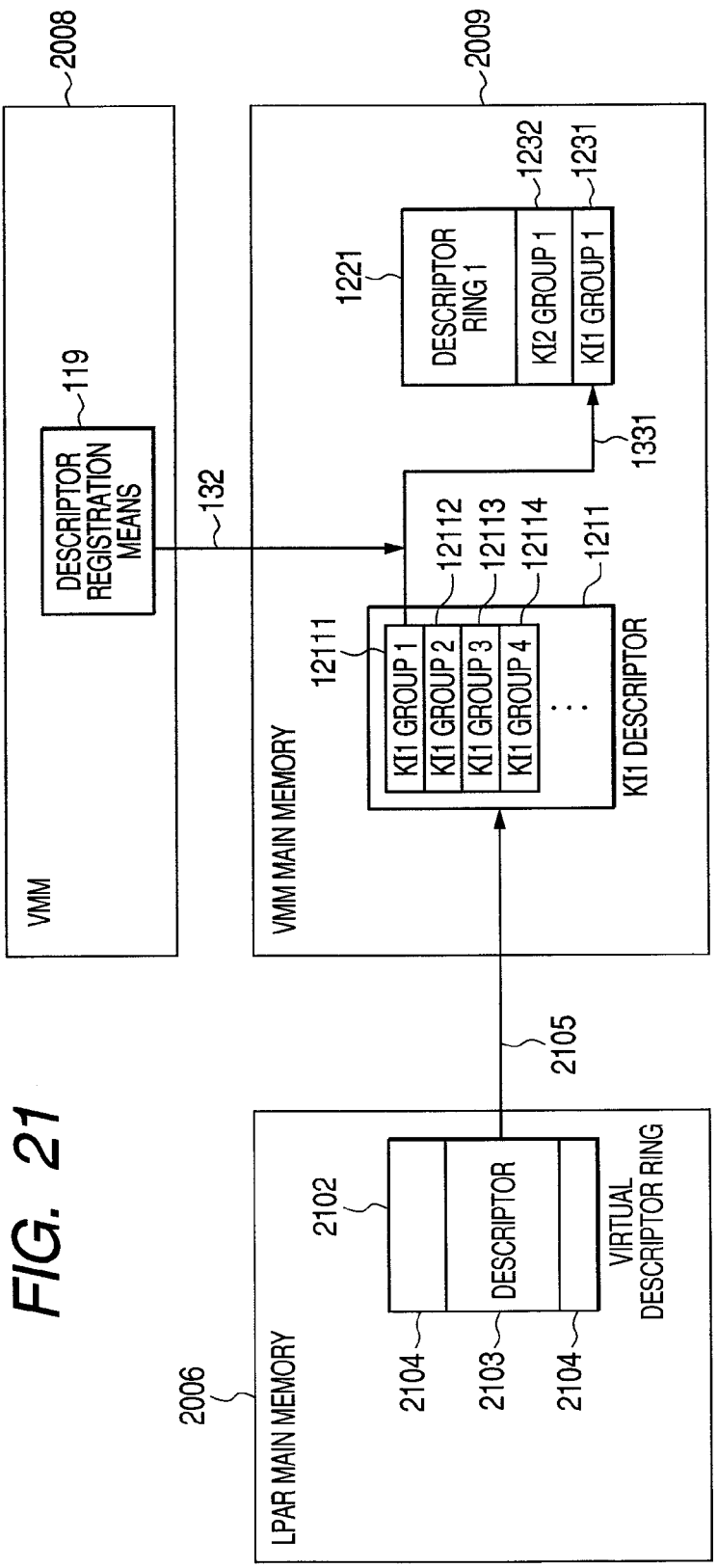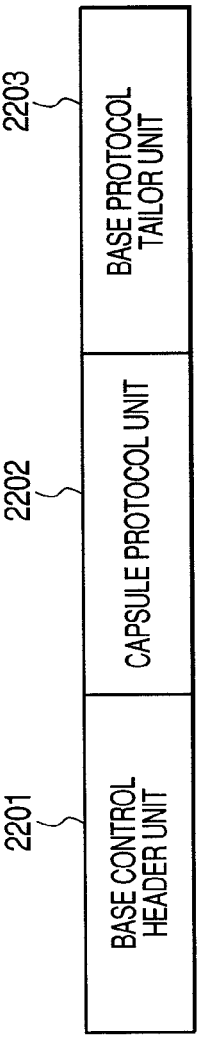

IO ADAPTER AND DATA TRANSFERRING METHOD USING THE SAME

CLAIM OF PRIORITY

The present application claims priority from Japanese application JP 2006-328934 filed on Dec. 6, 2006 and JP 2007-146429 filed on Jun. 1, 2007, the contents of which are hereby incorporated by reference into this application.

FIELD OF THE INVENTION

This invention relates to data transfer technology for I/O adapters mounted in information platform equipment typified by server devices, storage devices and network switching devices, and relates in particular to technology effective for bandwidth control of multiple capsule interfaces in capsule interface technology for carrying out data communication between devices via optional capsule protocols.

BACKGROUND OF THE INVENTION

IT systems on the Internet mutually connect systems made up of server devices, storage devices and client terminals, to perform data communication using protocols of diverse types. Typical protocols include the Ethernet, fiber channels and InfiniBand, etc. In this type of data communication, each device for performing communication contains an IO adapter for a dedicated protocol, and their IO adapter input/output ports are mutually connected to backplanes and cables. Moreover, dedicated protocol IO switches are connected via multiple stages when connecting to a large number of devices. During data transfer by application programs operating on these devices, an application program interface for the dedicated protocol IO drivers is generally utilized in operation systems running on these devices. When using an Ethernet protocol for example, the server device contains a network interface card (NIC) as the IO adapter, an Ethernet switch as the IO switch, and a twisted-pair cable as the mutual connecting cable. The application program can also perform data communication from an NIC driver running on the operation system. The IO adapters utilized for communicating between these types of devices typically using the DMA (Direct Memory Access) transfer method for improving communication performance. The DMA transfer method carries out data transfer by directly accessing the main storage memory without utilizing the CPU (Central Processing Unit). The DMA transfer method can transfer data without utilizing the CPU and therefore along with high-speed data transfer offers the advantage that there is no data processing load on the CPU.

Bandwidth control technology for conventional DMA transfer utilizes a method that renders a DMA engine effective just for the time needed to satisfy the bandwidth setting on a timer counter in the IO adapter unit. This type of data transfer device is described in JP-A No. 2002-183078.

In recent years, IO interface communication is mainly used for serial transmission between devices and advances are being made in increasing the transmission bandwidth capacity per the physical wiring layer. On the other hand, processing performance has improved in devices containing processors such as server devices because the processor chips now contain multiple cores. This increased performance has resulted in more methods that run (operate) multiple application programs on a single processor chip. Though the processing performance per a single processor chip and the bandwidth transfer capacity of the physical wiring layer has in this way improved, the number of I/O physical wires (wiring) per one processor has not increased. Therefore, one physical wire must logically be subdivided for sharing by multiple application programs. Technology for logically subdividing one physical wire is available as a capsule interface technology that forms an optional protocol of the base interface into a capsule and transfers it. Typical interfaces of this type are the InfiniBand and PCI Express Advance Switching Interconnect. By assigning these capsule interfaces to individual application programs, one physical wire can be jointly shared by multiple application programs.

SUMMARY OF THE INVENTION

However the present inventors found that the capsule interface technology of the related art possesses the following problems. Namely the related art had the problem that when applying capsule interface technology by bandwidth control technology using DMA transfer, that bandwidth control was only applied in DMA engine units and so could not be used for individual capsule interfaces. The related art therefore had the problem that the communication bandwidth required by the application program could not be guaranteed even if a capsule interface was applied to each application program.

This invention therefore has the object of providing an IO adapter and a data transfer method for the IO adapter that controls the bandwidth on each capsule interface even if those multiple capsule interfaces making up the IO adapter jointly share the DMA engine.

In order to resolve the aforementioned problems, the IO adapter in a typical embodiment as disclosed in this invention includes: includes one or more DMA engines; and one or more descriptor control units, and a data communication function for forming a descriptor ring serving as a ring buffer for retaining the descriptor corresponding to the descriptor control unit in the main storage memory and, generating one or more capsule interfaces serving as interfaces to encapsulate the desired communication protocol for data communication using the DMA engine, and perform data communication; and a management interface for setting the IO adapter from the management software for managing the information processing devices; and is characterized in that the IO driver serving as the IO adapter driver includes as capsule interface information at least a capsule interface identifier for identifying the capsule interface and, a capsule interface information table containing bandwidth information used by the capsule interface and, a ring scheduler information table containing the number of entries for descriptors used up at each specified cycle time at each capsule interface utilizing at least a descriptor ring as information for the descriptor ring and, a capsule interface information table setter means for generating a capsule interface identifier within the network connected to the IO adapter and storing the capsule interface identifier along with the bandwidth information for setting, in the capsule interface information table when the management software requests the generation of a capsule interface and; a descriptor generator means for generating a descriptor written with address information of data for transfer and data-transfer control information and, accepting capsule interface identifiers from the application program, and acquiring bandwidth information corresponding to the capsule interface identifier from the capsule interface information table and grouping the descriptors made in each data size for transfer within each fixed time in order to limit the bandwidth based on the bandwidth information, into one or more descriptor groups when the application program requests the transfer of data, and; a ring scheduler means for selecting a descriptor ring capable of searching the ring scheduler information table, checking the descriptor ring availability, and selecting a descriptor ring capable of data transfer and, registering the number of descriptor entries for the descriptor ring used in the data transfer when the application program requests the transfer of data and; a descriptor registration means for searching the ring scheduler information table at each cycle time and, copying one descriptor group among the descriptor groups of the capsule interface using the descriptor ring into the memory and performing DMA transfer when the application program requests the transfer of data and; a ring scheduler cancel means for deleting the scheduling information on the capsule interface matching the ring scheduling information when the transfer of descriptor group data has terminated.

The data transferring method in another aspect of this invention to resolve the aforementioned problems, is an IO adapter including: one or more DMA engines; one or more descriptor control units; a data transferring method for forming a descriptor ring serving as a ring buffer for retaining the descriptor corresponding to the descriptor control unit in the main storage memory and, including a data communication function for forming one or more capsule interfaces serving as interfaces for encapsulating the desired communication protocol for performing data communication utilizing the DMA engine, and perform data communication; and a management interface for setting the IO adapter from the management software for managing the information processing devices; and is characterized in that, the procedure for generating the capsule interface includes:

a step for generating a capsule interface identifier within the network connected to the IO adapter, when the management software requests the generating of a capsule interface and;

a step to register bandwidth information specified by the management software and the generated capsule interface identifier, as capsule interface information items, into the capsule interface information table containing at least the capsule interface identifier and bandwidth information for using the capsule interface, and;

a step to notify the management software about the generated capsule interface identifier.

Moreover, as a procedure for deleting the capsule interface, the data transferring method for resolving the aforementioned problems, is characterized in containing a step for deleting information corresponding to the capsule interface identifier from the capsule interface information table, when a request for deleting the capsule interface was received from the management software and; a step for notifying the management software that deletion of the capsule interface is completed.

Yet further, the data transferring method to resolve the aforementioned problems, includes as a procedure for transferring data using the capsule interface, a step for acquiring bandwidth information corresponding to the specified capsule interface identifier for the capsule interface information table when a request to transfer data specifying the capsule interface identifier is received from the application program and; a step for generating a descriptor written with address information of data for transfer and for data-transfer control information, and deciding the number of descriptors corresponding to the data size for transfer within a fixed cycle time based on the acquired bandwidth information and grouping the generated descriptors into descriptor groups of individual numbers and; a step for searching the ring scheduler information table containing the number of descriptor entries of descriptor groups as the number of descriptor entries used up in data transfer within the cycle time in each capsule interface using a descriptor ring as at least a descriptor ring information item and, selecting a descriptor ring capable of verifying the descriptor ring availability status and transferring data and, registering the number of entries of descriptors used up in the data transfer within the cycle time in a ring scheduler information table, and as a procedure for repeating the data transfer process until all descriptor data transfer is complete, includes a step for verifying whether a descriptor ring was scheduled at each fixed cycle time, and if scheduled, searching the ring scheduler information table and, copying one descriptor group among the descriptor groups of the capsule interface using the descriptor ring into the memory and performing DMA transfer and; a step for deleting the scheduling information on the matching capsule interface from the ring scheduler information table when data transfer of the descriptor group is completed; and a step for verifying whether the process of transferring all descriptor data was finished or not.

Typical aspects of the invention as disclosed in these specifications render the following effects as briefly described next.

The guaranteed communication bandwidth can be used when the application programs share one physical wire by utilizing the capsule interface.

The IO driver on the VMM unit can perform bandwidth control of each capsule interface so that the IO adapter hardware logic (circuitry) can be reduced to allow making the LSI chip surface area smaller so that the LSI cost can be lowered.

Moreover bandwidth control can be performed at a finely distributed level for each capsule interface so that congestion within the IO interface can be reduced and stable data communication achieved.

BRIEF DESCRIPTION OF THE DRAWINGS

FIG. 5 is a drawing showing an example of the grouping of descriptors for the capsule interface KI2 for the IO driver of the first embodiment;

FIG. 6 is a drawing showing an example of the capsule interface KI1 prior to schedule registration of the ring scheduler information table for descriptor ring 1 in the IO driver of the first embodiment;

FIG. 7 is a drawing showing an example of the capsule interface KI1 after schedule registration of the ring scheduler information table for descriptor ring 1 in the IO driver of the first embodiment;

FIG. 8 is a drawing showing an example of the capsule interface KI1 after canceling schedule information in the ring scheduler information table for descriptor ring 1 in the IO driver of the first embodiment;

FIG. 21 is a drawing showing one example of the corresponding relation between the main storage memory for the VMM and the main storage memory for the logical partition (LPAR) according to the sixth embodiment;

FIG. 22 is a drawing showing one example of the data packet for the capsule interface using the IO adapter of the first embodiment;

DETAILED DESCRIPTION OF THE PREFERRED EMBODIMENTS

Figure 1:
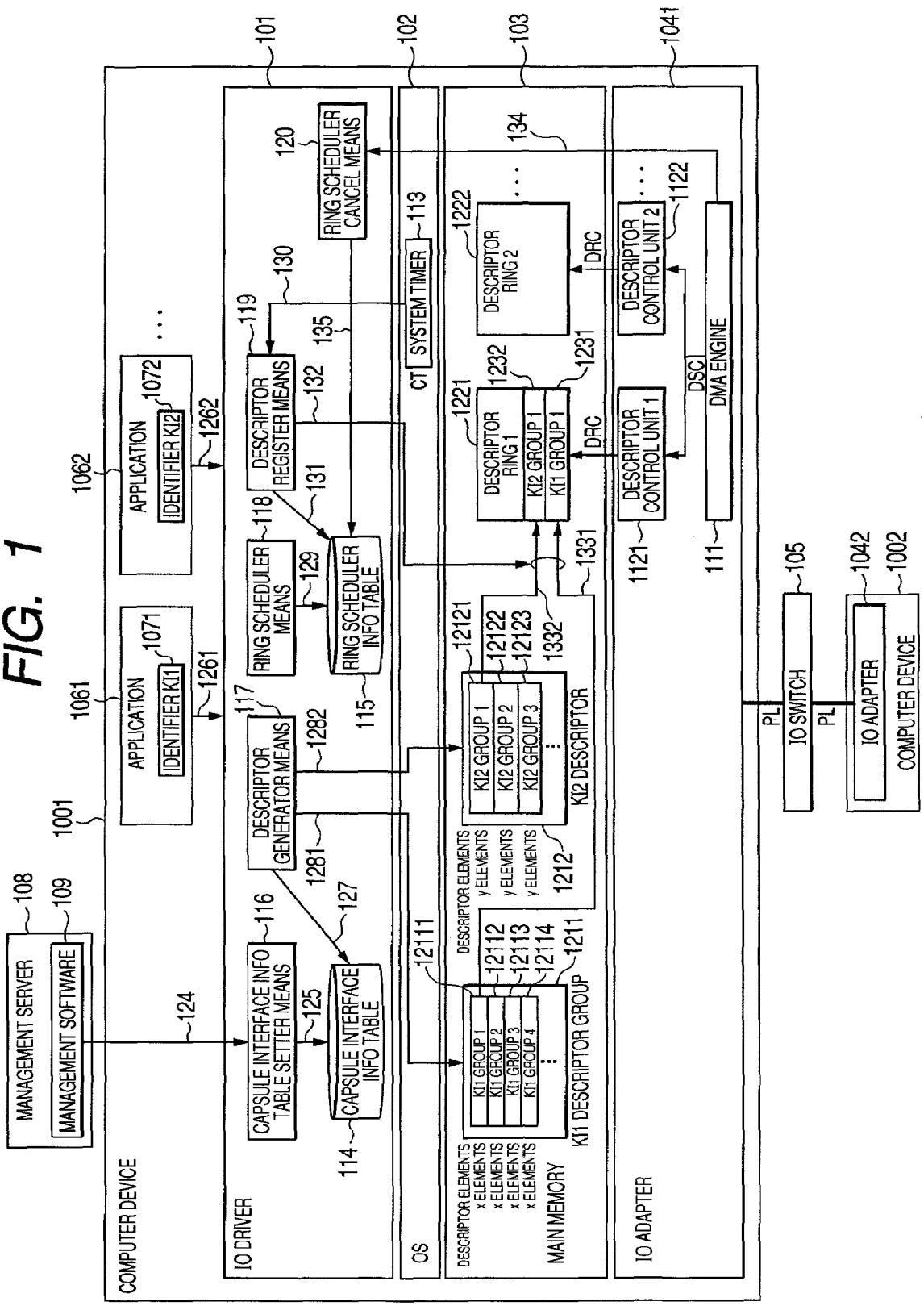
FIG. 1 is a block diagram of the IO driver and the IO adapter of the first embodiment of this invention.

The embodiments of this invention are described next in detail while referring to the drawings. In all drawings for describing the embodiments, those sections with the same reference numerals generally are the same members and their repeated description is omitted.

First Embodiment

Figure 2:
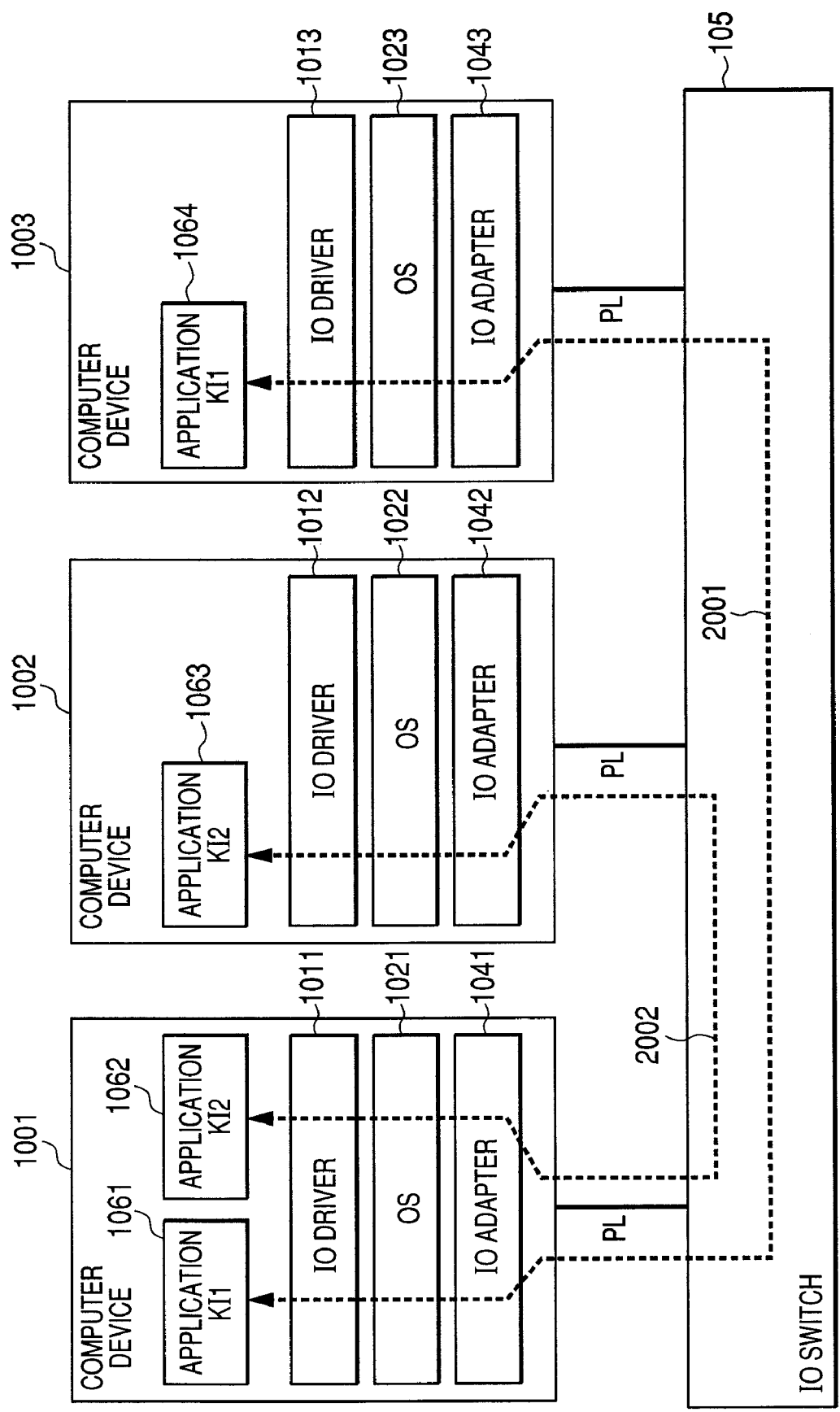
FIG. 2 is a drawing showing one example of the data communication between the computer device containing the IO adapter of the first embodiment.

FIG. 1 is a block diagram of the IO driver and the IO adapter of the first embodiment of this invention. FIG. 2 is a drawing showing one example of data communication between computer devices containing the IO adapter of the first embodiment. In a typical structure for data communication using the IO adapter of this invention as shown in FIG. 2, the IO adapters 1041, 1042, 1043 are respectively mounted in the computer devices 1001, 1002, 1003; and the IO drivers 1011, 1012, 1013 serving as the drivers for the IO adapters 1041, 1042, 1043 operated on the operation systems (OS) 1021, 1022, and 1023. The computer devices 1001, 1002, 1003 are respectively connected via the physical wiring PL to the IO switch 105 and carry out mutual data communication. When the application programs 1061, 1062, 1063, and 1064 operating on the computer devices are carrying out data communication by using the IO adapters 1041, 1042, 1043, then the optional protocol is encapsulated into the protocol forming the base protocol for the IO adapter to form the capsule interface serving as the interface for communications. FIG. 2 shows an example of the capsule interface KI1 2001 and capsule interface KI2 2002. FIG. 22 is a drawing showing an example of the data packet for the capsule interface using the IO adapter of the first embodiment. As shown in FIG. 22, the data packets for the capsule interfaces KI1, KI2 are made up at least from a protocol header unit 2201 serving as the base, and a capsule protocol unit 2202 from the entire encapsulated protocol. The base protocol types include a base protocol tailor unit 2203 including an error correcting field, etc. In the example shown in FIG. 2, the capsule interface KI1 2001 is assigned to the application programs 1061, 1063; and the capsule interface KI2 2002 is assigned to the application programs 1062, 1064. During the transfer of data from the application program 1061 to the application program 1063, the application program 1061 makes a data transfer request to the IO driver 1011 and sends the encapsulated data packet by way of the operation system 1021, and IO adapter 1041. The data packet sent from the adapter 1041 via the physical wiring PL is switched by the IO switch 105, and arrives at the IO adapter 1043 mounted in the computer device 1003 serving as the data transfer destination. The data packet that arrived at the IO adapter 1043 passes through the operation system 1023, and the IO driver 1013, and the data is transferred to the operation program 1063 serving as the data transfer destination. Here, an example of data transfer between computer devices was described but the invention is not limited to this example and for example RAID (Redundant Arrays of Inexpensive Disk) controllers for storage devices and line cards for network switching devices may be utilized. A special feature possessed by this invention in the IO adapter of the data transfer source is described next. As shown in FIG. 1, the computer device 1001 for the data transfer source is connected by way of the physical wiring PL and the IO switch 105 to the computer device 1002 data transfer destination. The management server 108 is a management server operated by the management software 109 for managing the devices within the system made up of the computer devices 1001, 1002, and the IO switch 105. An IO adapter 1041, 1042 are mounted in the respective computer devices 1001, 1002 as described for FIG. 2. A description of the software program operating on the computer device 1002 as the data transfer destination is omitted in FIG. 1; however, the actual structure is as described for FIG. 2. The computer device 1001 includes the IO adapter 1041, the main storage memory 103, the operating system 102, the IO driver 101, one or more data transfer source application programs 1061, 1062 - - - . The IO adapter 1041 contains a DMA engine 111 for performing DMA transfer processing, and one or more descriptor control units 1121, 1122, - - - . The main storage memory 103 includes descriptor rings 1221, 1222, - - - stored in the ring buffer in a descriptor transfer sequence including an address for the buffer storing the data and the data transfer method formed during DMA transfer and; the descriptors 1211, 1222 temporarily formed in each capsule interface. The number of descriptor rings 1221, 1222, and so on is the same as the number of descriptor control units 1121, 1122, - - - that are valid for IO adapter 1041 operation. These descriptor control units 1121, 1122, - - - , and so on manage the first descriptor address and the last descriptor address that are registered in the descriptor rings 1221, 1222, - - - . of the main storage memory 103, acquire the descriptor in the first descriptor address from the memory read access DRC when the DMA engine 111 requests data transfer DSC, and transfer the data according to the contents of the descriptor. Arbitration is performed among the descriptor control units when the DMA engine 111 contains multiple descriptor control units 1121, 1122 and so on. Examples of arbitration methods include the simple round-robin, time-sharing methods that give a priority level to each descriptor control unit however this invention is not limited to a particular method. The IO driver 101 contains a capsule interface information table setter means 116, a descriptor generator means 117, a ring scheduler means 118, a descriptor registration means 119, and a ring scheduler cancel means 120; and as information tables contains a capsule interface information table 114 and a ring scheduler information table 115.

The data transfer method for the capsule interface KI1, KI2 utilizing the IO adapter 1041 are described next for the first embodiment using a flow chart. This data transfer method is made up of the following three methods in the first embodiment. A first method (1) generates the capsule interfaces KI1, KI2 for use (capsule interface generating method). A second method (2) is a deletion method for terminating the capsule interfaces KI1, KI2 (capsule interface deleting method). A third method (3) is a method for transferring data by the application programs 1071, 1072 using the capsule interfaces KI1, KI2 (data transfer method using capsule interfaces). Hereafter each method is described in order.

Figure 10:
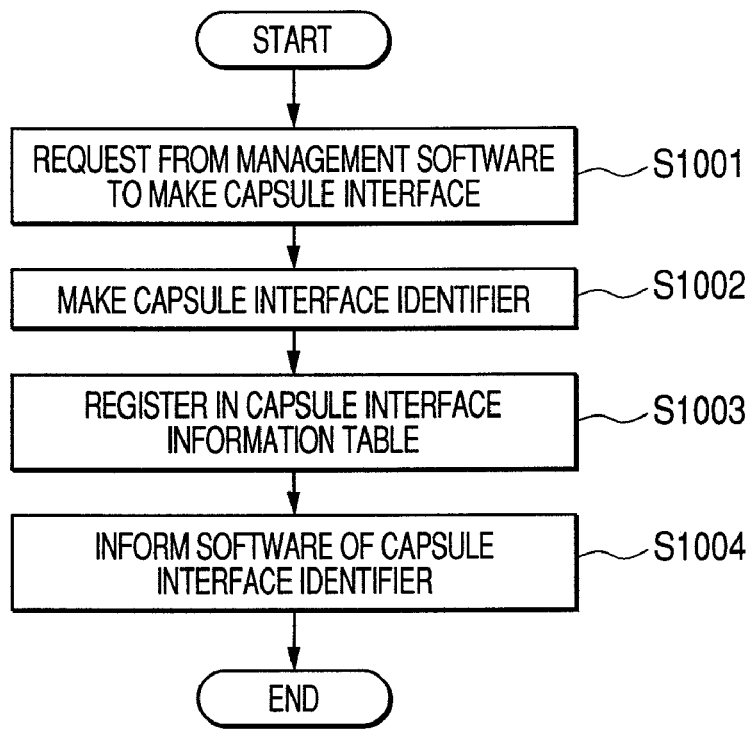
FIG. 10 is a flow chart of the capsule interface forming method of the embodiment.

First of all, the first method (1) (capsule interface generating method) is described while referring to FIG. 10. FIG. 10 is a flow chart of the capsule interface generating method using the IO adapter of the first embodiment. The management software 109 possesses function for generating and deleting the capsule interface for transferring data between the computer device 1002 and the computer device 1001 per the IO driver 101 from the management interface 124. A method utilizing a LAN is available as an example of the management interface 124 but this invention is not limited to a particular method. In the example in FIG. 1, a capsule interface KI1 is assigned to the application program 1061, and a capsule interface KI2 is assigned to the application program 1062. The capsule interface information table setter means 116 receives (step S1001) a request from the management software 109 to generate a capsule interface, generates a common identifier within the system for the capsule interface (step S1002), and registers the data transfer bandwidth information assigned to the capsule interface as instructed by the management software 109 and the capsule interface identifier, into the capsule interface information table 114 (step S1003). The range of the system as used here indicates the device group containing the IO adapters 1041, 1042 connected with the IO switch 105. In the example in FIG. 1, KI1, KI2 are generated as identifiers for the capsule interface. These identifiers KI1, KI2 are needed for specifying what capsule interface to use when the application programs are using capsule interfaces and therefore the capsule interface information table setter means 116 notifies the management software 109 (step S1004) of the generated capsule interface identifiers (KI1 or KI2).

Figure 11:
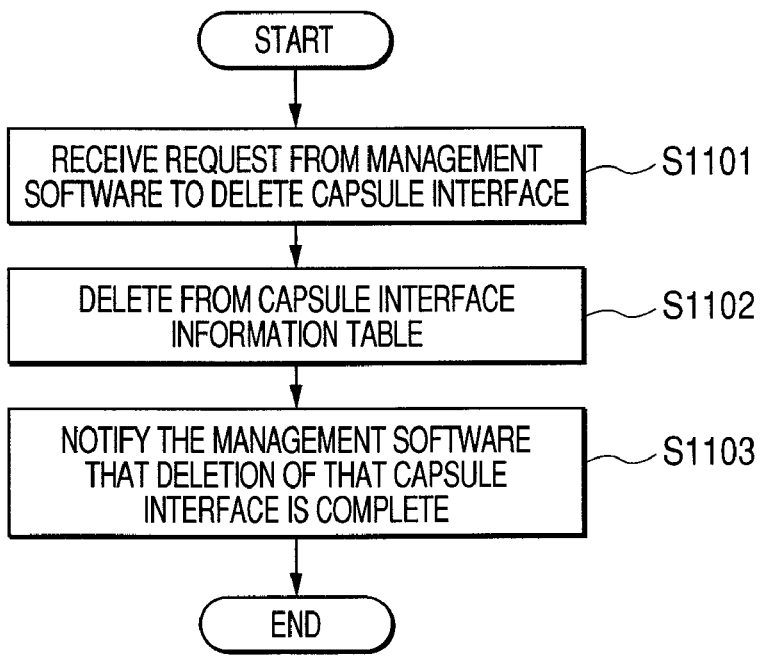
FIG. 11 is a flow chart showing the method for deleting the capsule interface of the first embodiment.

The capsule interface deleting method is described next while referring to FIG. 11. FIG. 11 is a flow chart showing the method for deleting the capsule interface using the IO adapter of the first embodiment. The capsule interface information table setter means 116 receives a request from the management software 109 to delete the capsule interface (step S1101), and deletes the information on the subject capsule interface for deletion, from the capsule interface information table 114 (step S1102). The capsule interface information table setter means 116 then notifies the management software 109 that the deletion is complete (step S1103).

Figures 3, 4:
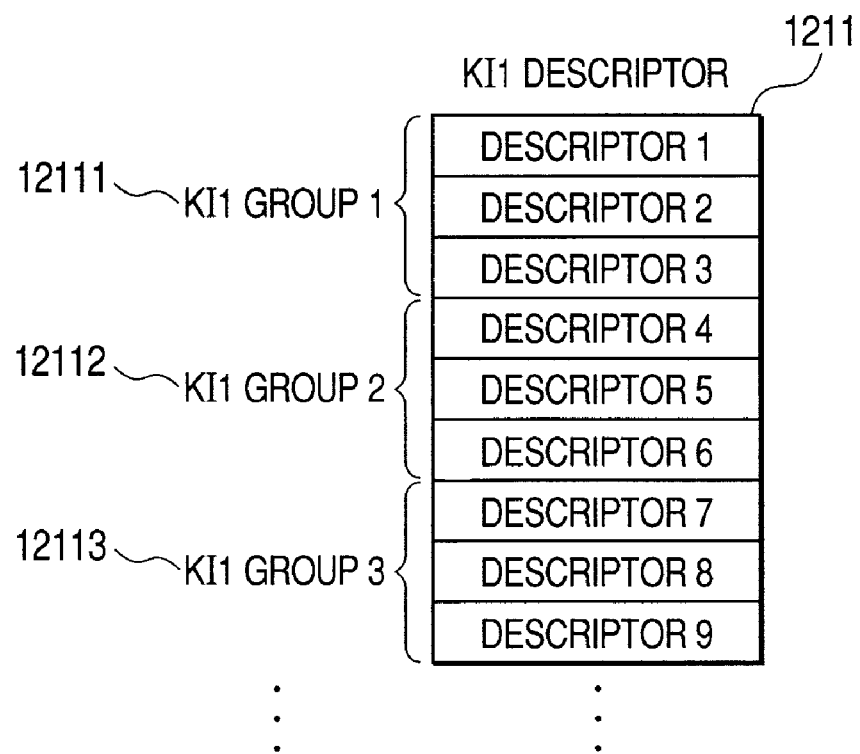
FIG. 3 is a drawing showing one example of the capsule interface information table in the IO driver of the first embodiment.
FIG. 4 is a drawing showing an example of the grouping of descriptors for the capsule interface KI1 for the IO driver of the first embodiment.

FIG. 3 is a drawing showing one example of the capsule interface information table in the IO driver (FIG. 1) of the first embodiment. Expressing the capsule interface information table 114 in a table format, as shown in Table FT3 of FIG. 3 yields a structure with a row of capsule interface identifiers K301 and a row of data transfer bandwidth information K302 assigned to the capsule interface. As shown in FIG. 3, 10 MB/s is registered as data bandwidth transfer information in the capsule interface identifier KI1, and 50 MB/s is registered as data bandwidth transfer information in the capsule interface identifier KI2.

Figure 12:
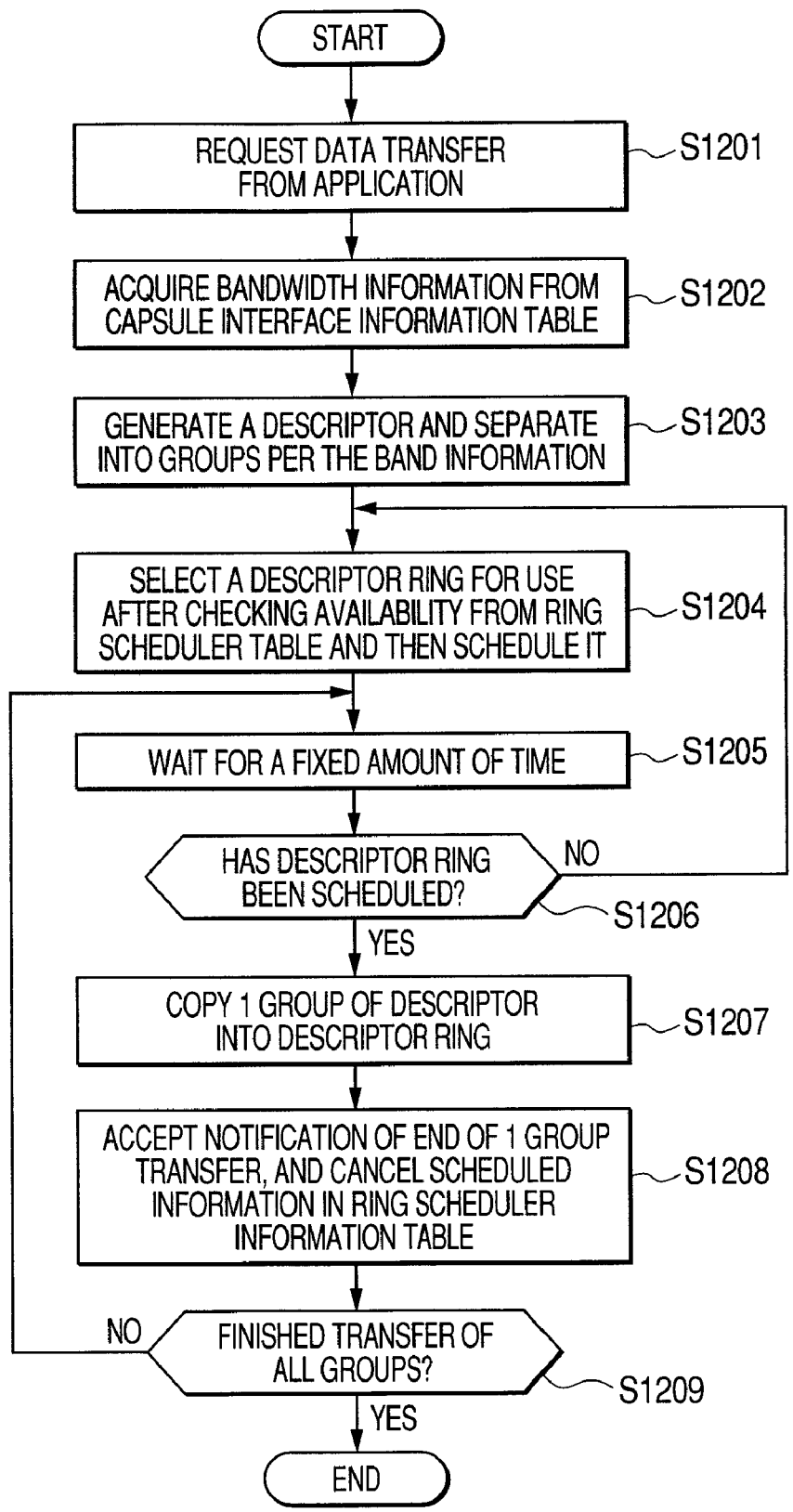
FIG. 12 is a flow chart showing the method for transferring data using the capsule interface of the first embodiment.

The method for transferring data used in the capsule interface is described next while referring to FIG. 12. FIG. 12 is a flow chart showing the method for transferring data using the capsule interface via the IO adapter of the first embodiment. When the application programs 1061 and 1062 are transferring data using the capsule interfaces KI1, KI2, the application program interfaces 1261, 1262 for transferring IO driver data are used to specify the capsule interface identifiers 1071, 1072 and request data transfer (step S1201). The IO driver 101 receives a data transfer request from the application programs 1061 and 1062, and the descriptor generator means 117 acquires data transfer bandwidth information K302 (step S1202) matching the capsule interface identifiers 1071, 1072 from the capsule interface information table 114 via the capsule interface information table reference 127. The descriptor generator means 117 generates the descriptors 1281, 1282 for each capsule interface in the main storage memory region 103 based on the descriptor generating requests 1281, 1282. Usually multiple descriptors are generated in one data transfer. Further, the descriptors are grouped so as to satisfy the following formula, based on the acquired data transfer bandwidth information K302 (step S1203).

$$\Sigma BS = BW \times CT$$

In this formula, the data size per descriptor BS is the data buffer size for each descriptor when generating descriptors; the data transfer bandwidth BW is the value obtained from the data transfer bandwidth information K302; and the one cycle time CT is the specified time set by the IO driver. Namely, this formula is for deciding the number of descriptors that correspond to the data size BW×CT for data that must be transferred within a fixed cycle time, and grouping the descriptors into groups of fixed amounts.

In FIG. 1, 12111, 12112, 12113, 12114, and so on are the grouped descriptors of the capsule interface KI1; and 12121, 12122, 12123 and so on are the grouped descriptors of the capsule interface KI2. When the data size of each descriptor is fixed at 4 KB and the single cycle time CT is 1 msec, then the data transfer bandwidth set for the capsule interface KI1 is 10 MB per second so that the number of individual descriptors per a single group is 0.001×10×1024/4=2.56 descriptors and converting to an integer yields x=3 descriptors. Also, the data transfer bandwidth set for the capsule interface KI2 is 50 MB per second so that the number of individual descriptors per a single group is 0.001×50×1024/4=12.8 descriptors and converting to an integer yields y=13 descriptors.

FIG. 4 is a drawing showing an example of the grouping of descriptors for the capsule interface KI1 for the IO driver of the first embodiment in FIG. 1. Also, FIG. 5 is a drawing showing an example of the grouping of descriptors for the capsule interface KI2 for the IO driver of the first embodiment FIG. 1. As shown in FIG. 4, in the capsule interface KI1, each group contains three descriptors. The KI1 group 1 contains the descriptor 1 through descriptor 3. The KI1 group 2 contains the descriptor 4 through descriptor 6. The KI1 group 3 contains the descriptor 7 through descriptor 9. As shown in FIG. 5, the descriptors in the capsule interface KI2 are grouped into 13 descriptors. The KI2 group 1 contains the descriptor 1 through descriptor 13. The KI2 group 2 contains the descriptor 14 through descriptor 26.

Figure 17:
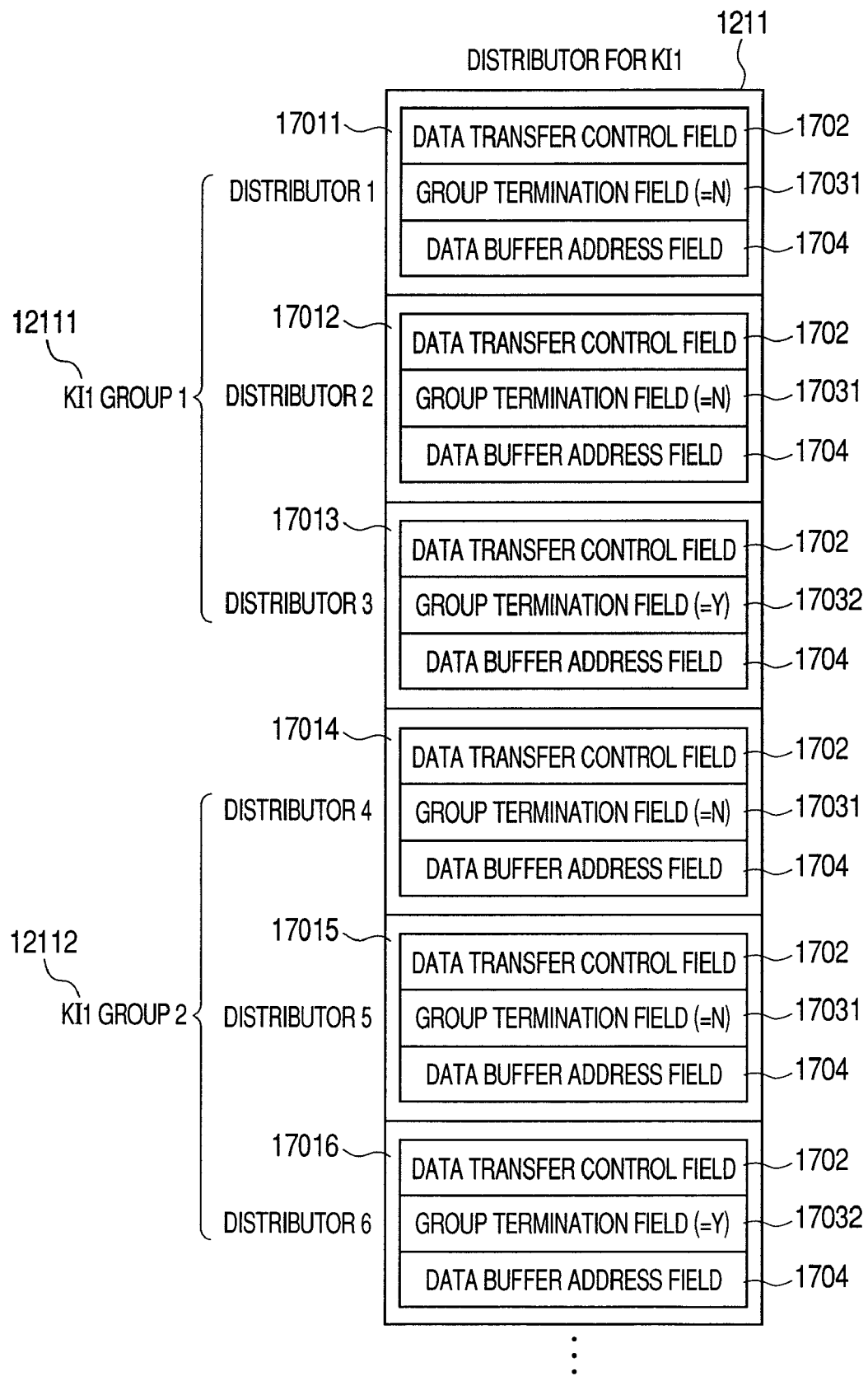
FIG. 17 is a drawing for showing an example of the descriptor for the capsule interface KI1 of the IO driver of the first embodiment.

FIG. 17 is a drawing for showing an example of the descriptor for the capsule interface KI1 of the IO driver of the first embodiment in FIG. 1. As shown in FIG. 17, the descriptor 1211 for the capsule interface KI1 contains multiple descriptors 17011, 17012, 17013, 17014, 17015, 17016 and so on. Each of the descriptors includes a data transfer control field 1702 for holding information required for data transfer, group termination fields 17031, 17032 as the final descriptors for the descriptors 12111, 12112, and a data buffer address field 1704 for holding the leading (beginning) addresses for the buffer for the transfer data. During the group final descriptors 17013, 17016, the group termination field is (=Y) 17032; and during descriptors that are not the final descriptors 17011, 17012, 17014, 17015, the group termination field is (=N) 170321. When the group termination field is (=Y) 17032, then the DMA engine 111 uses the hardware interrupt 134 to notify that data transfer has ended.

After receiving a ring scheduling request 129, the ring scheduler means 118 refers to the ring scheduler information table 115, and selects a descriptor ring capable of transferring the capsule interface data and, registers in the ring scheduler information table 115 of the selected descriptor ring, the number of descriptor entries used up by the capsule interface within each cycle time (step S1204). The number of entries is equivalent to the number of descriptors for each single group as determined previously in step S1203.

FIG. 6 is shows the scheduling contents in the ring scheduler information table for the descriptor ring 1 in the IO driver in FIG. 1, and shows the state prior to schedule registration of the capsule interface KI1. FIG. 7 shows the status of the capsule interface KI1 after schedule registration, in the scheduling contents in the same ring scheduler information table. The ring scheduler information table 115 is as shown by the table format in table FT61 of FIG. 6 is made up of rows including a cycle time identifier K611, and an entry number K612 for descriptors used by the capsule interface. The table FT61 in FIG. 6 shows the state before schedule registration of the capsule interface KI1, and shows the case where only the capsule interface KI2 is scheduled. Therefore only the row for the number of entries K6122 for capsule identifier KI2 was registered. The number of descriptors for each group of the capsule interface KI2 is 13 as described above so that the number of descriptor entries for each cycle time is 13. The Table FT62 in FIG. 7 on the other hand, shows the ring scheduler information table 115 after schedule registration of the capsule interface KI1. As shown in FIG. 7, a row has been added for the number of entries K6121 of the descriptor used by the capsule interface KI1. As already described, the number of descriptors for each group of the capsule interface KI1 is 3 so that the number of entries for the descriptors of each cycle time is 3.

Next, the descriptor registration means 119 confirms whether the capsule interfaces KI1, KI2 scheduled the descriptor ring or not (step S1206) by waiting for a fixed time at each cycle time CT (step S1205). If not scheduled, then the step S1204 is re-performed. If scheduled then, the number of descriptor entries K6121, K6122 for each of the capsule interfaces KI1, KI2 is acquired from the current cycle time identifier (K611 in FIG. 7) by way of the ring schedule information table reference 131 from the ring schedule information table.

Based on the above information, the descriptor registration means 119 makes memory copies 1331, 1332 of one group of the capsule interface descriptors 1211, 1212 into the descriptor rings 1221, 1222 via the descriptor copy request 132 (step S1207).

As shown in the example in FIG. 1, the descriptor registration means 119 makes a memory copy of the descriptor group 12111 of the capsule interface KI1, and the descriptor group 12121 of the capsule interface KI2 into the ring buffer regions 1231, 1232 of the descriptor ring 1221.

Figure 9:
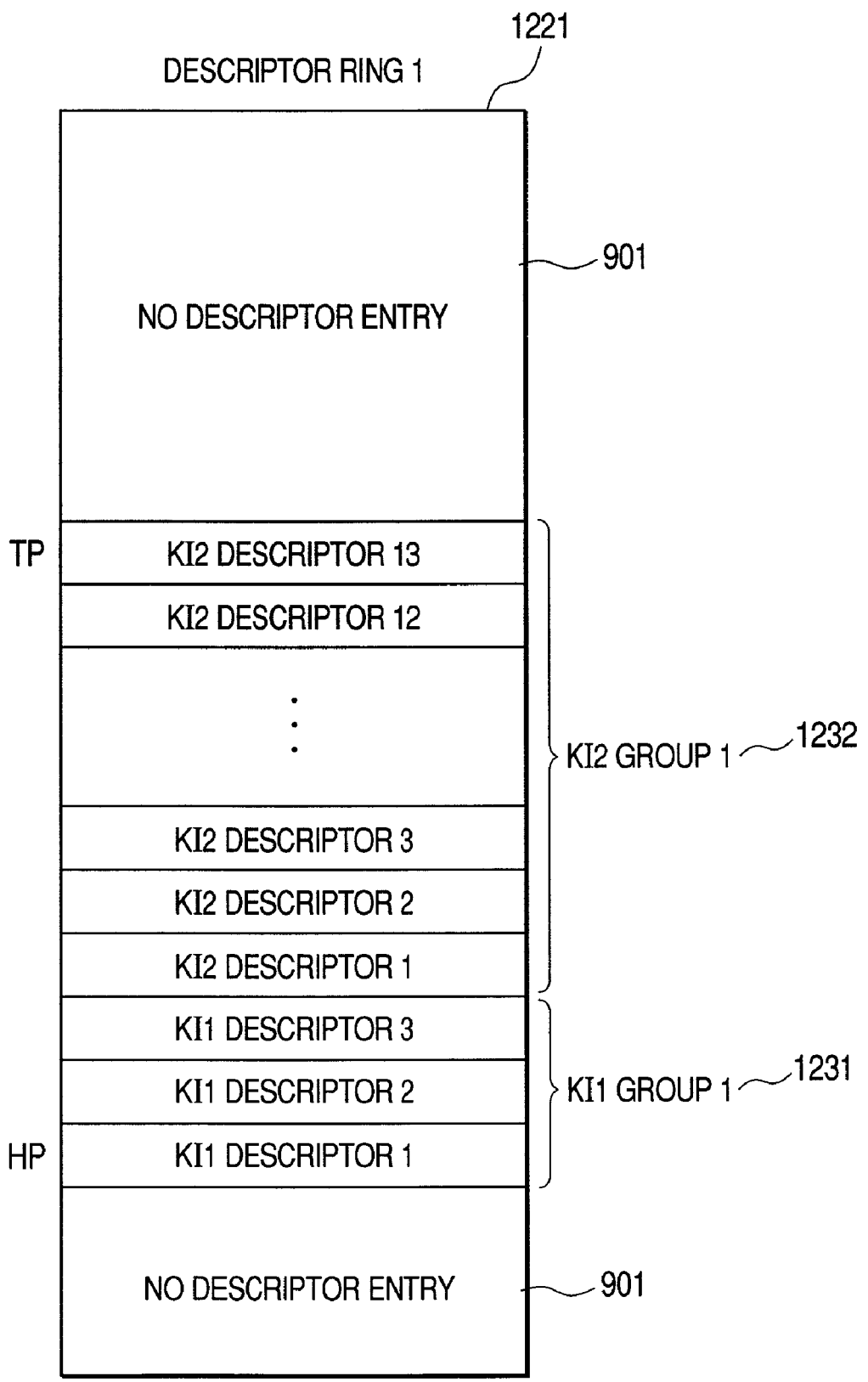
FIG. 9 is a drawing showing one example of the structure of the descriptor ring of the IO driver of the first embodiment.

FIG. 9 is a drawing showing one example of the structure of the descriptor ring of the IO driver of the first embodiment. As shown in FIG. 9, the descriptor ring 1221 contains three descriptors as the descriptor 1 through descriptor 3 copied into the descriptor group 12111 of capsule interface KI1 in the ring buffer region 1231; and thirteen descriptors as the descriptor 1 through descriptor 13 copied into the descriptor group 12121 of the capsule interface KI2 in the ring buffer region 1232. In the example shown in FIG. 9, only the capsule interfaces KI1 and KI2 use the descriptor ring 1221 so there are no descriptor entries in the other regions 901 of the ring buffer. The descriptor 1 of capsule interface KI1 becomes the head pointer HP for descriptor ring 1221; and the descriptor 13 of capsule interface KI2 serving as the final descriptor entry becomes the tail pointer for the descriptor ring 1221. The method for notifying the descriptor registration means 119 of the fixed cycle time CT is for example a method that accepts a software interrupt 130 at each fixed cycle CT time from the system timer 113 via a function possessed by the operation system 102 as shown in FIG. 1. However, this invention is not limited to this method and other methods may be utilized for giving notification of the fixed cycle time. Besides the method shown in FIG. 1, there is also a method that for example measures a fixed cycle time CT by using a hardware timer counter, and then accepts a hardware interrupt (or break-in). A function of the DMA engine 111 of IO adapter 1041 can generate data packets for transfer by registering descriptors in the descriptor rings 1221, 1222 and performs data transfer. Next, in the processing after data transfer of the fixed cycle time CT, the ring scheduler cancel means 120 receives an interrupt 134 after data transfer of descriptor groups 1231, 1232 for the capsule interfaces KI1, KI2 from the DMA engine 111 has ended, and complies with the ring scheduler information table rewrite request 135 by deleting the number of descriptor entries K612 of the applicable capsule interfaces KI1, KI2 in the ring scheduler information table 115 (step S1208). FIG. 8 is a drawing showing the scheduling (information) contents of the ring scheduler information table 115 where the ring scheduler cancel means 120 has canceled the schedule information, after transfer of the descriptor group 1231 data for the capsule interface KI1. As shown in FIG. 8, the number of descriptor entries K6121 of capsule interface KI1 at cycle time t1 is changed to zero (0) by canceling the schedule information. Next, a decision is made on whether the data transfer of all descriptor groups for the capsule interfaces is finished or not (step 1209). This decision allows repeating the step S1205 through step S1209 when data transfer of all descriptor groups is incomplete.

The first embodiment as described above is therefore capable of controlling the data transfer bands in each of the capsule interfaces KI1, KI2 even when multiple application programs share the DMA engine 111. The first embodiment is in this way capable of using the guaranteed section of the communication bandwidth even when the application programs share one physical wire using the capsule interfaces.

Second Embodiment

Figure 13:
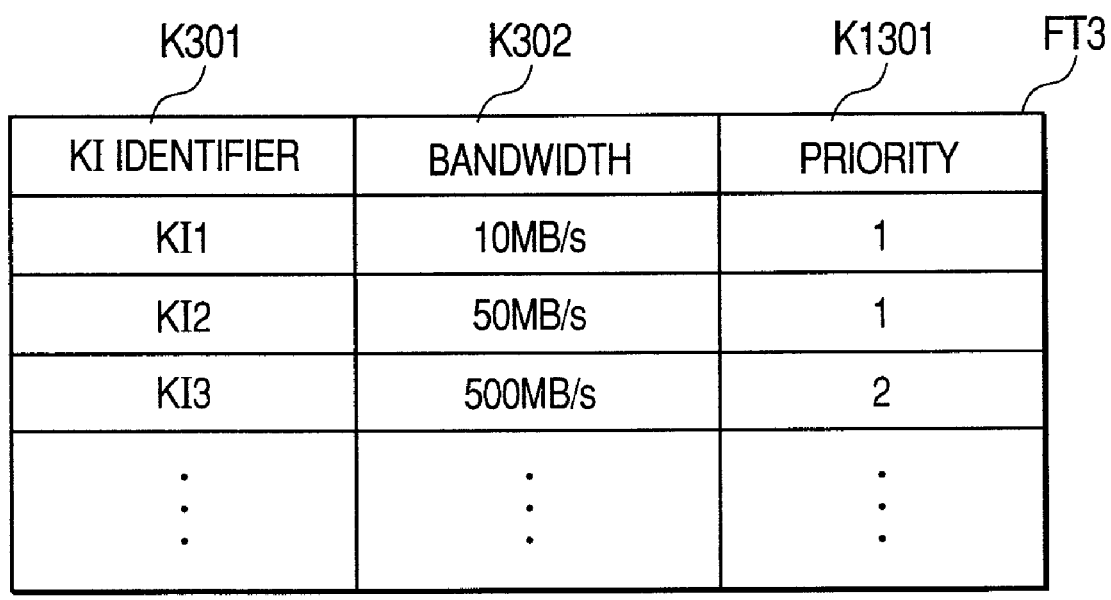
FIG. 13 is a drawing for describing an example of the capsule interface information table of the second embodiment of this invention.

The structure of the IO adapter of the second embodiment of this invention is described next while referring to FIG. 13. FIG. 13 is a drawing for describing an example of the capsule interface information table of the second embodiment. The IO adapter of the second embodiment differs from the IO adapter of the first embodiment in the capsule interface information table 114 section. The following description covers the points differing from the first embodiment.

In the second embodiment as shown in FIG. 13, priority information K1301 has been added to the capsule interface information table 114. This priority (level) information is utilized to control the priority levels between the capsule interfaces KI1, KI2. This priority control method for example, changes the descriptor rings 1221, 1222 and so on, for each of the priority level information and adds priority levels to the arbitration method used by the descriptor control units 1121, 1122 of DMA engine 111. However, the invention is not limited to this method for providing priority levels. The following described points were added in order to provide the priority information K1301 to the capsule interfaces KI1, KI2. During forming of the capsule interface, the management software 109 attaches the priority (level) information and makes a capsule interface generating request 124. Further, when registering the capsule interface into the capsule interface information table 114, the capsule interface information table setter means 116 also registers the priority level information K1301 at the same time. Also, the ring scheduler means 118 selects the descriptor rings 1221, 1222 for use based on the priority level information K1301 during the data transfer using the capsule interface. An example of a method for selecting the descriptor rings 1221, 1222 is to select descriptor ring 1221 for priority level 1, and descriptor ring 1222 for priority level 2. However this invention is not limited to this method. The second embodiment as described above is capable of performing priority control among the capsule interfaces based on the priority information.

Third Embodiment

Figure 14:
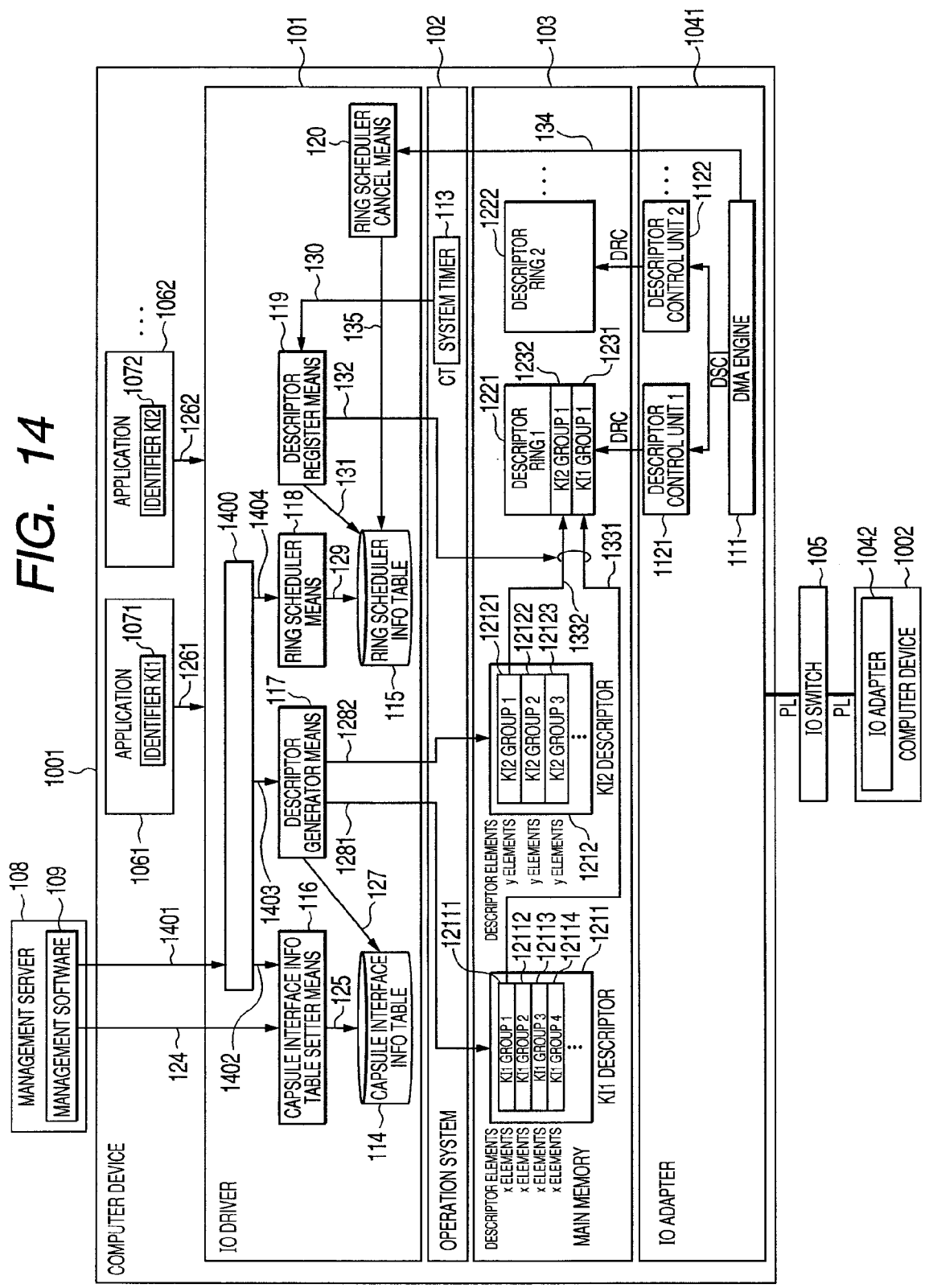
FIG. 14 is a block diagram of the IO adapter and the IO driver of the third embodiment of this invention.
Figure 15:
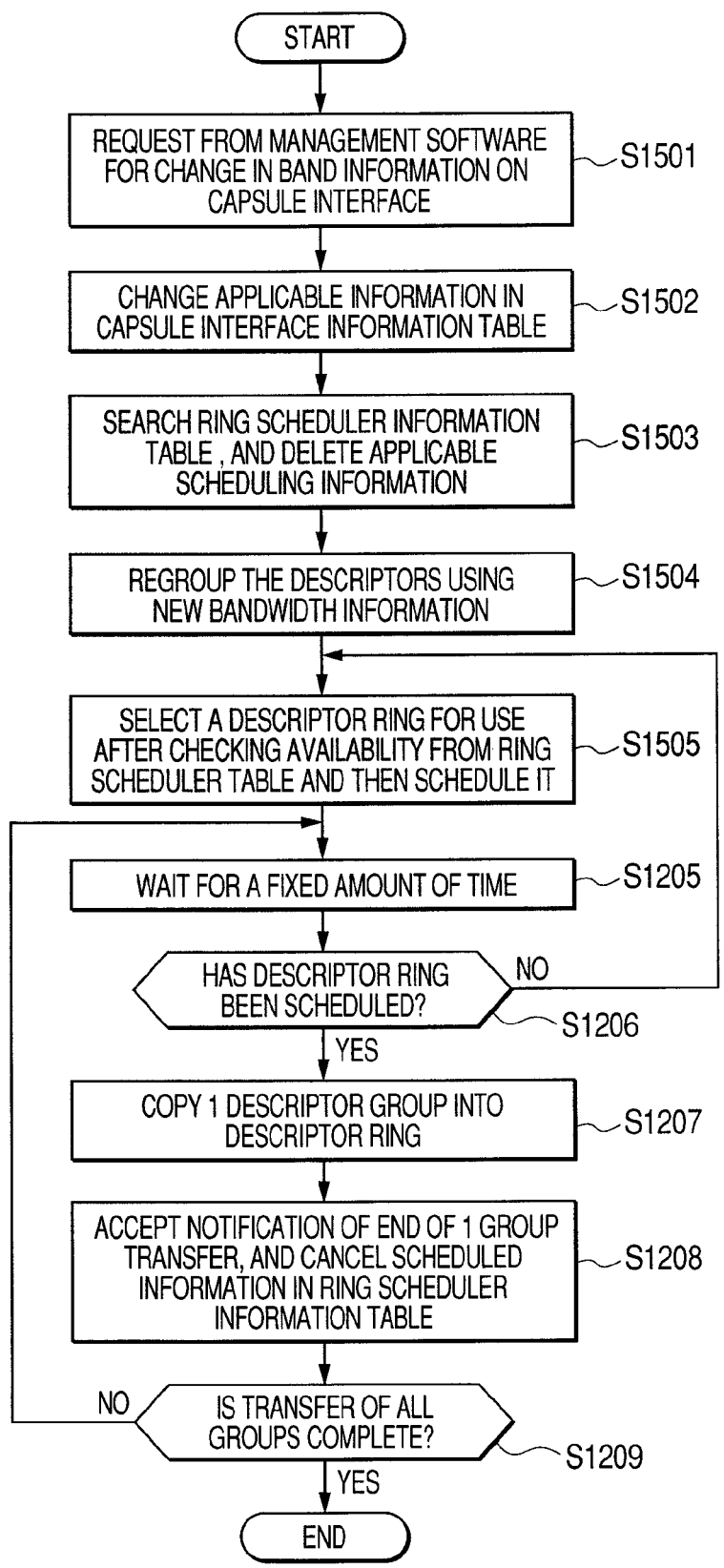
FIG. 15 is a flow chart of the data transfer method using the capsule interface during changing of bandwidth information in the third embodiment.

The structure of the IO adapter of the third embodiment of this invention is described next while referring to FIG. 14 and FIG. 15. FIG. 14 is a block diagram of the IO adapter and the IO driver of the third embodiment. FIG. 15 is a flow chart of the data transfer method using the capsule interface during changing of bandwidth information by the IO adapter in the third embodiment. The IO adapter of the third embodiment differs from the IO adapter of the first embodiment shown in FIG. 1 in that a section of the IO driver is different. Namely, a bandwidth changer means 1400 has been added to the IO driver of the third embodiment as shown in FIG. 14.

The operation in the third embodiment during bandwidth information changing, when the application programs 1071, 1072 are transferring data by using the capsule interfaces KI1, KI2 is described next while referring to FIG. 15. The management software 109 makes a request via the IO driver 101 per the management interface 1401 for a change in the bandwidth information (step S1501) for a specific capsule interface (here, capsule interface KI1). The bandwidth control means 1400 receives this request and makes a bandwidth information change request 1402 to the capsule interface information table setter means 116. The capsule interface information table setter means 116 then changes the bandwidth information for the capsule interface KI1 (K302 of FIG. 3) in the capsule interface information table 114 (step S1502). The bandwidth control means 1400 makes a schedule information cancel request 1404 to the ring scheduler means 118. The ring scheduler means 118 then deletes the number of descriptor entries (K6121 in FIG. 7) for the capsule interface KI1 from the ring scheduler information table 115 (step S1503). The bandwidth control means 1400 next makes a descriptor regrouping request 1403 to the descriptor generator means 117. The descriptor generator means 117 in this way performs regrouping based on bandwidth information after changing the descriptor 1211 for capsule interface KI1 in the main storage memory (step S1504). The bandwidth control means 1400 next makes a descriptor ring schedule request 1404 to the ring scheduler means 118. The ring scheduler means 118 refers to the ring scheduler information table 115 and selects a descriptor ring capable of data transfer of the capsule interface KI1, and re-registers the number of descriptor entries used up by the capsule interface KI1 at each cycle time in the ring scheduler information table 115 of the selected descriptor ring (step S1505). In the subsequent operation, a check is made on whether the capsule interfaces KI1, KI2 scheduled the descriptor ring at each fixed cycle time or not. If these were scheduled, then the descriptor groups are memory-copied into the descriptor ring 1221 according to the number of descriptor entries used up at each capsule interface cycle time recorded in the ring schedule information table, and DMA transfer is performed. The process from step S1205 through step S1209 for implementing this operation is the same as the data transfer operation in step S1205 through step S1209 in the first embodiment as shown in FIG. 12 so a description is omitted here.

The above described third embodiment can dynamically performing finely distributed bandwidth control for each capsule interface even during data transfer so that stable data communication with reduced congestion in the IO interface can be achieved.

Fourth Embodiment

Figure 16:
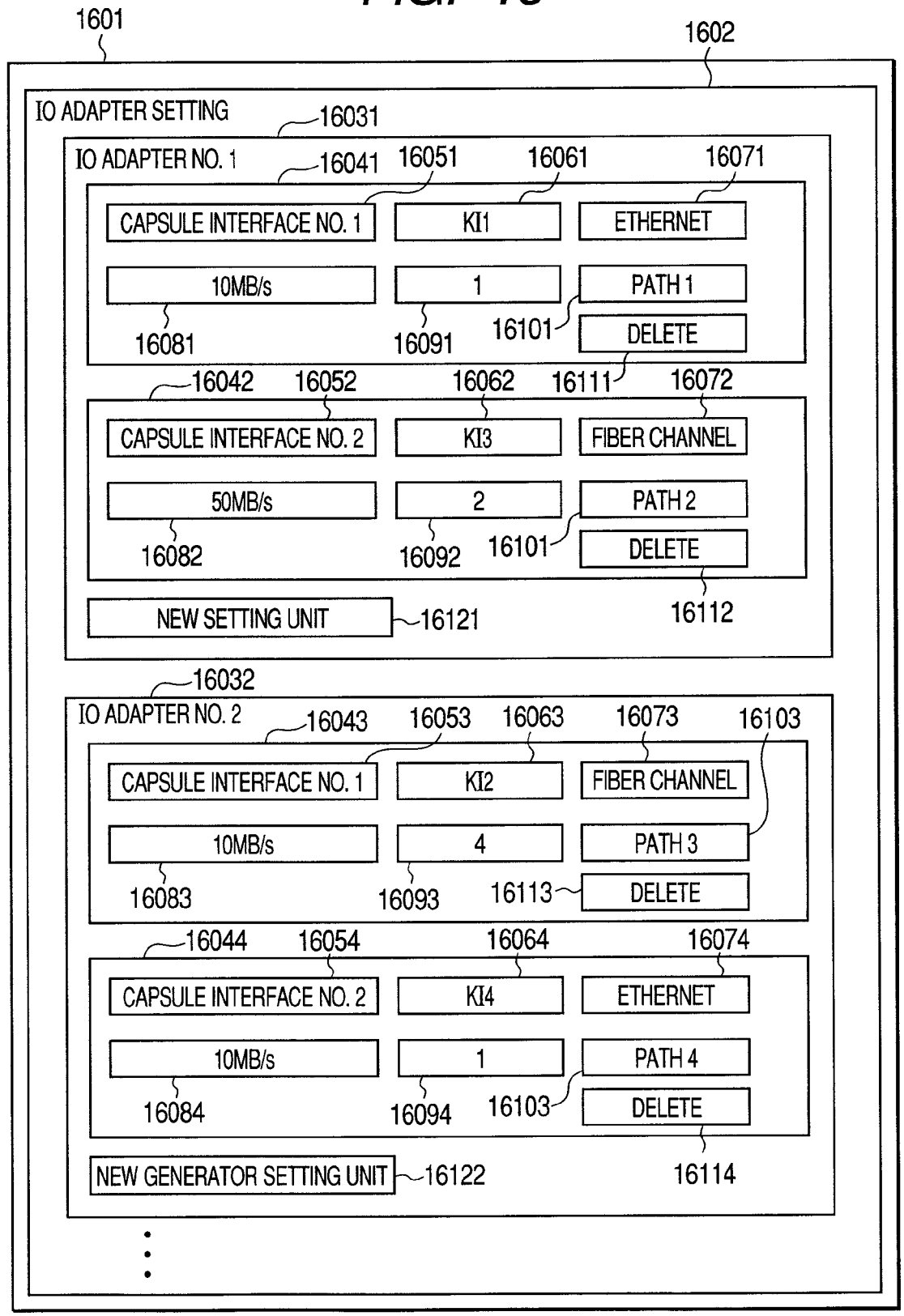
FIG. 16 is a drawing showing the graphical management interface of the management software of the fourth embodiment of this invention.

The structure of the IO adapter of the fourth embodiment of this invention is described next while referring to FIG. 16. FIG. 16 is a drawing showing the graphical management interface of the management software of the fourth embodiment. The structure of the IO adapter of the fourth embodiment differs from the IO adapter of the first embodiment in that a section of the management software is different. The following description focuses on the section differing from the first embodiment. The management software 109 of the fourth embodiment contains a management interface 1602 for setting the IO adapter shown in FIG. 16. The management software 109 generally contains a management console 1601 serving as the management (control) display. The management interface 1602 includes IO adapter setter units 16031, 16032, - - -, for each IO adapter. These IO adapter setter units 16031, 16032, and so on, include capsule interface setter units 16041, 16042, 16043, 16044 for each of the capsule interfaces making up the respective IO adapters; and new generating setting units 16121, 16122 for generating new capsule interfaces. The respective capsule interface setter units 16041, 16042, 16043, 16044 include: interface No. display units 16051, 16052, 16053, 16054 (or capsule interface No.) for displaying numbers within the capsule interface IO adapter, capsule interface identifier display unit 16061, 16062, 16063, 16064 for displaying the capsule interface identifiers, protocol type setter units 16071, 16072, 16073, 16074 for setting the type of encapsulated protocol, bandwidth information setter units 16081, 16082, 16083, 16084 for setting bandwidth information to assign to the capsule interfaces, priority level information setter units 16091, 16092, 16093, 16094 for setting the priority level information to assign to the capsule interfaces, path information setter units 16101, 16102, 16103, 16104 for setting the actual (physical) path making up the capsule interface, and the delete setter units 16111, 16112, 16113, 16114 for deleting the currently configured capsule interfaces.

Fifth Embodiment

Figure 18:
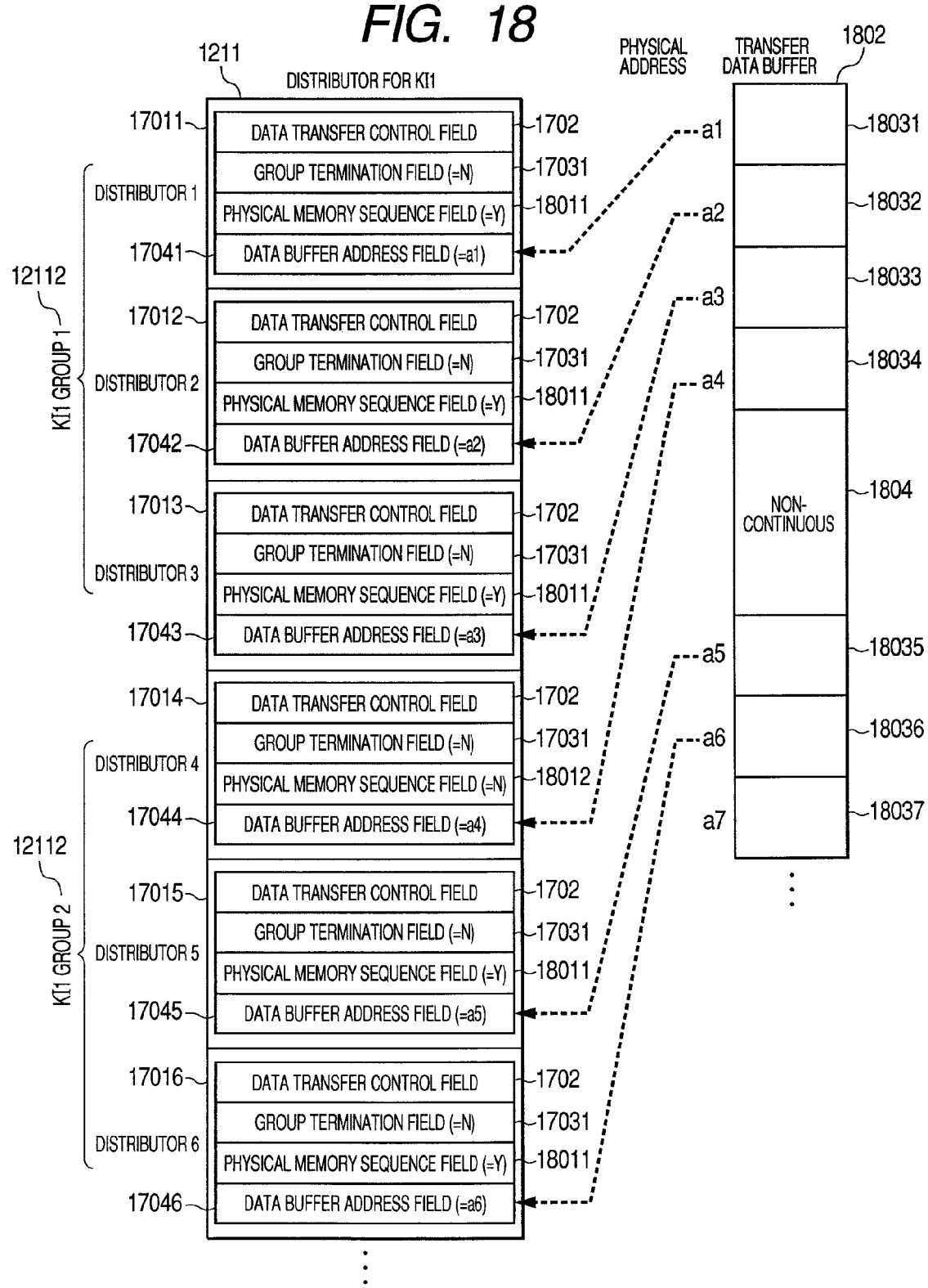
FIG. 18 is a drawing for showing an example of the descriptor for the capsule interface KI1 of the IO driver of the fifth embodiment.
Figure 19:
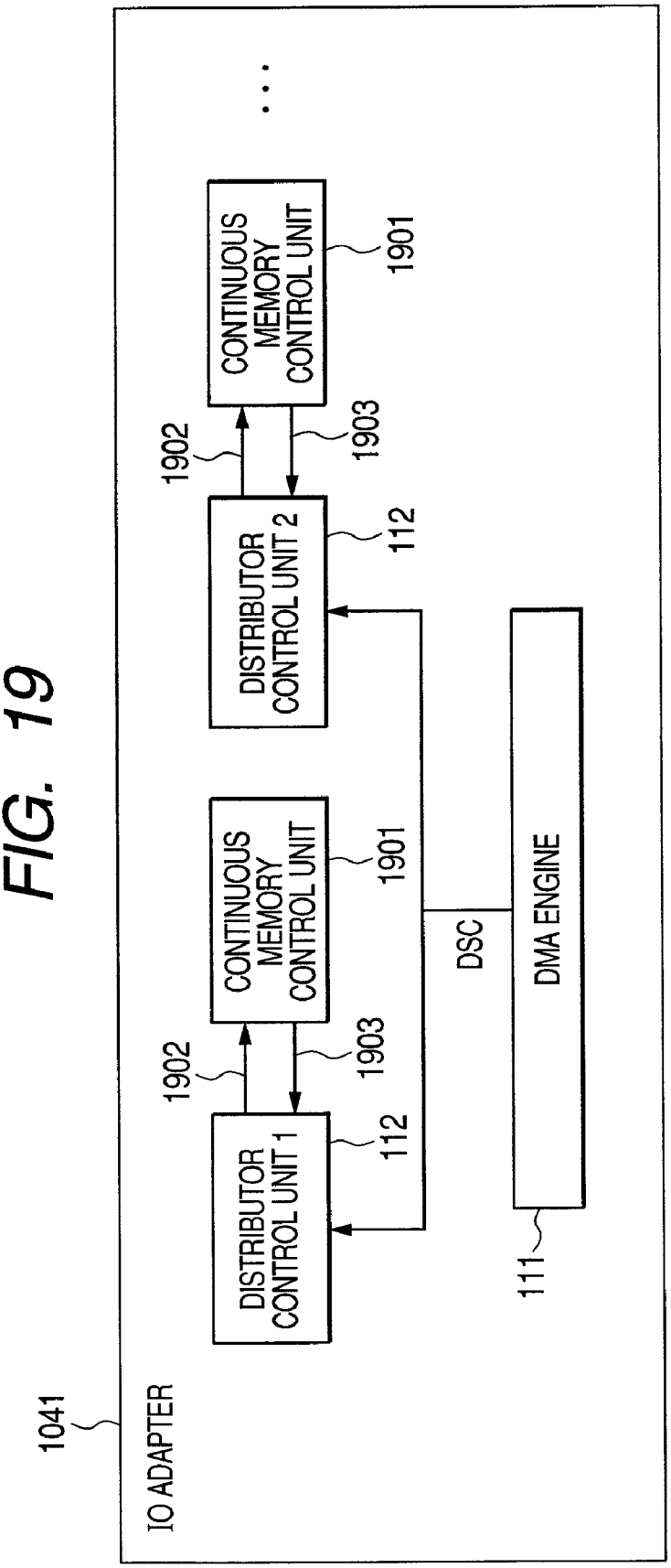
FIG. 19 is a block diagram showing the structure of the IO adapter of the fifth embodiment.

The structure of the IO adapter of the fifth embodiment of this invention is described next while referring to FIG. 18 and FIG. 19. FIG. 18 is a drawing for showing an example of the descriptor for the capsule interface KI1 of the IO driver of the fifth embodiment. FIG. 19 is a block diagram showing the structure of the IO adapter of the fifth embodiment. The structure of the IO adapter of the fifth embodiment differs from the IO adapter of the first embodiment of FIG. 1 only in a section making up the descriptors and a section making up the IO adapter. The following description centers on those sections differing from the first embodiment.

The descriptor 1211 for the capsule interface (shown in drawing as KI1) of the fifth embodiment contains physical memory sequence fields 18011, 18012 as shown in FIG. 18 for showing whether the physical memory address for the transfer data buffer 1802 is continuous between the applicable descriptor and the next descriptor. If continuous then the physical memory sequence field 18011 showing this state as (=Y), and if not continuous the physical memory sequence field 18012 shows this state as (=N) are attached. As shown in the transfer buffer 1802 in the example in FIG. 18, the transfer data buffers 18031 through 18034, and the transfer data buffers 18035 through 18037 are continuous (sequential), and a non-continuous 1804 is present between them. The physical memory addresses a1 through a7 for these transfer data buffers, are substituted into the descriptor data buffer address fields 17041, 17042 and so on. In order to show the data transfer address is non-continuous, an item showing non-continuity is input into the physical memory sequence field 18012 of 17014 in the descriptor 4. The physical memory is continuous in the other descriptors so an item showing continuity is input into the physical memory sequence field 18011.

The processing method within the IO adapter 1041 for the physical memory sequence field is described next while referring to FIG. 19. As shown in FIG. 19, in the fifth embodiment, a continuous memory control unit 1901 has been added to the structure of the IO adapter 1041 of the first embodiment in FIG. 1. The continuous memory control unit 1901 acquires the descriptor from the descriptor control unit 112 (1902) and retains at least one or more descriptor histories of the capsule interface KI1. Based on the values in the physical memory sequence fields 17031, 17032 for the descriptor that is one descriptor prior to the descriptor currently being processed, the continuous memory control unit 1901 reads out only the minimum required fields such as the physical memory sequence fields 17031, 17032 from the main storage memory for the descriptor currently being processed when the physical memory sequence field 17031 is (=Y), and executes DMA transfer using the result calculated from the physical memory address for the one prior descriptor address of the transfer data buffer. The fifth embodiment described above, is capable of reading out descriptors and the transfer data buffer from the main storage memory, even when the transfer data buffer was subdivided into small, fixed data sizes for each descriptor, as shown in the first embodiment.

Sixth Embodiment

Figure 20:
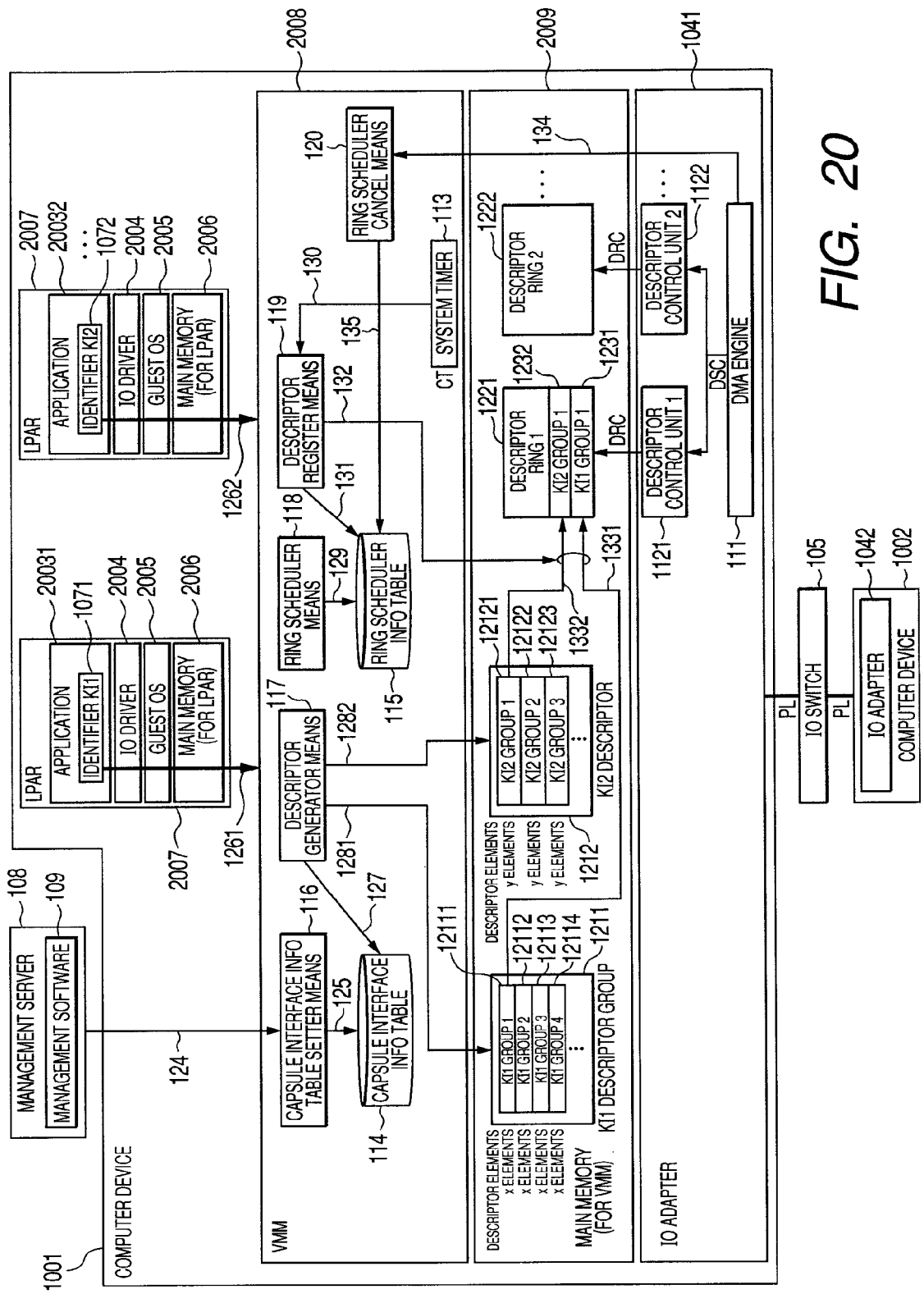
FIG. 20 is a block diagram of the IO adapter and the IO driver when applied to the VMM (Virtual Machine Monitor) of the sixth embodiment of this invention.

The structure of the IO adapter of the sixth embodiment of this invention is described next while referring to FIG. 20 and FIG. 21. FIG. 20 is a block diagram of the IO adapter and the IO driver as applied to the VMM (Virtual Machine Monitor) of the sixth embodiment. FIG. 21 is a drawing showing one example of the corresponding relation between the main storage memory of the VMM and the main storage memory for the logical partition (LPAR) according to the sixth embodiment. The points where the structure of the IO adapter of the sixth embodiment differs from the IO adapter of the first embodiment shown in FIG. 1, is that functional components of the IO driver 101 and the operation system 102 were changed to the VMM 2008, and that an LPAR 2007 structure has been added. The following description centers on those sections differing from the first embodiment.

As shown in FIG. 20, in the sixth embodiment, the application programs 20031, 20032 operate on the LPAR 2007 via the virtual functions of VMM 2008. The LPAR 2007 includes the LPAR main storage memory 2006, the guest operation system 2005, the IO driver 2004 for the guest operation system, and the application programs 20031, 20032. These application programs 20031, 20032 retain the capsule identifiers KI1 1071, KI2 1072 for utilizing the capsule interfaces. Here, the IO driver 2004 does not possess the functions of the IO driver 101 of the first embodiment. In the sixth embodiment, the VMM 2008 possesses the functions of IO driver 101 and the operation system 103 of the first embodiment. In other words, the VMM2008 includes the capsule interface information table setter means 116, a descriptor generator means 117, a ring scheduler means 118, a descriptor registration means 119, and a ring scheduler cancel means 120, a capsule interface information table 114, a ring scheduler information table 115 and a system timer 113. The VMM main storage memory 2009 has the functions of the main storage memory 103 of the first embodiment. All other sections of the structure are identical to the first embodiment.

Next, the inter-relation of the main storage memory 2006 for the logical partition (LPAR) and the main storage memory 2009 for the VMM in the sixth embodiment is shown using FIG. 21. FIG. 21 shows the case where the LPAR main storage memory 2006 contains the virtual descriptor ring 2102 for IO driver 2004 on the LPAR. The virtual descriptor ring 2102 includes a descriptor 2103 for the capsule interface KI1. Among the ring buffers in the virtual descriptor ring 2102, the 2104 contains no descriptor entry section. Information from the descriptor 2103 of the capsule interface KI1 is grouped from the virtual memory-physical memory conversion process 2105 included in the VMM, into the capsule interface descriptors 1211 the same as in the first embodiment, in the VMM main storage memory 2009. Further, the descriptor registration means 119 in the VMM 2008 copies (1331) the descriptor group 1231 into the physical descriptor ring 1221 the same as in the first embodiment. The interrelation of the VMM main storage memory 2009 and the main storage memory 2006 on the logical partition (LPAR) is an example and the invention is not limited to this method. For example if the IO driver 2004 on the LPAR does not contain a virtual descriptor ring 2102, then the transfer data buffer information on the LPAR main storage memory can be directly provided to the VMM. In the sixth embodiment as described above, the bandwidth control method of the IO adapter of the invention can be utilized by application programs on the LPAR making up the VMM.

Seventh Embodiment

Figure 23:
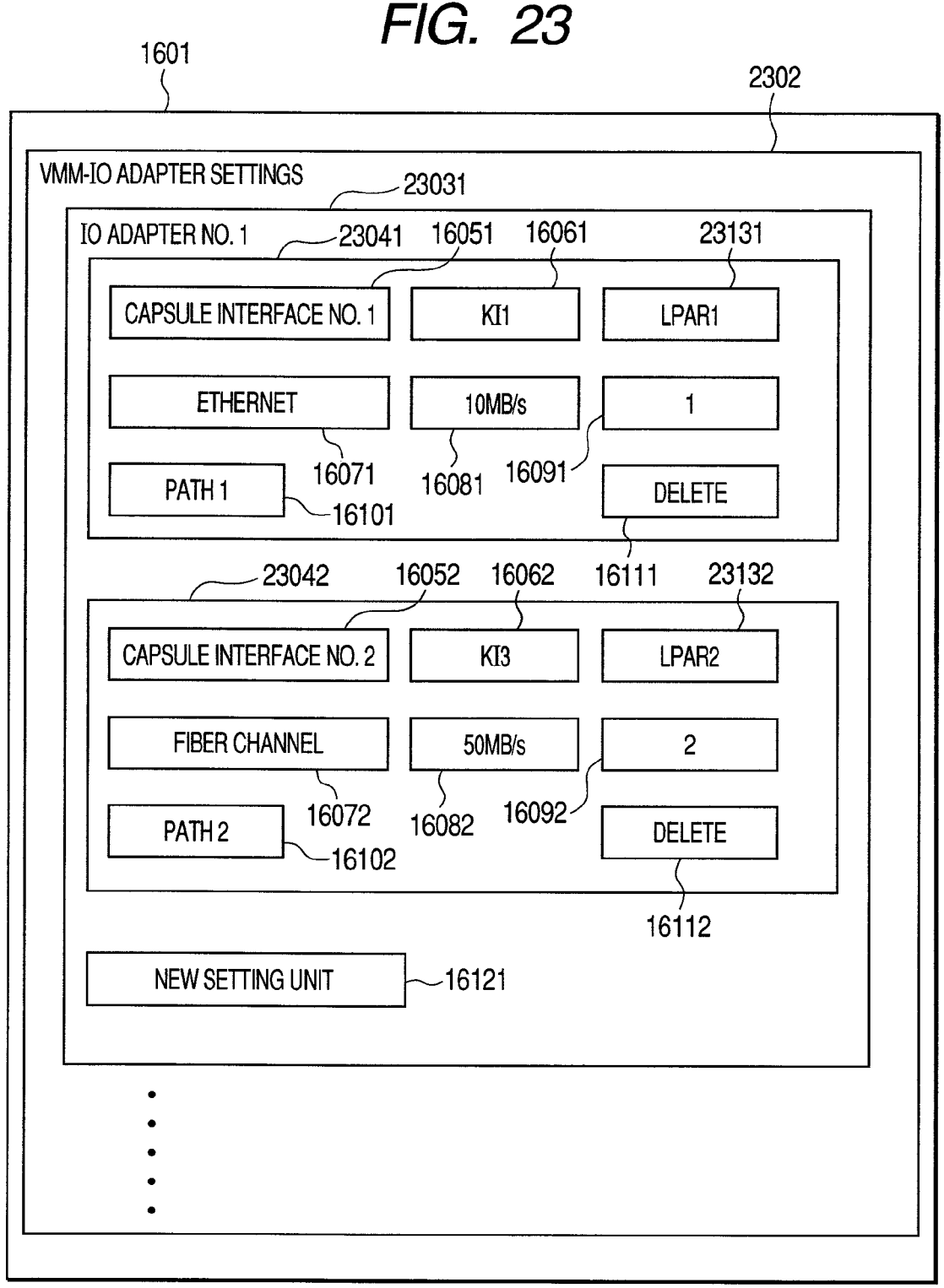
FIG. 23 is a drawing showing the graphical management interface for the management software of the seventh embodiment of this invention.

The structure of the IO adapter of the seventh embodiment of this invention is described next while referring to FIG. 23. FIG. 23 is a drawing showing the graphical management interface for the management software of the seventh embodiment for the case where VMM is utilized for the IO adapter and IO driver. The structure of the IO adapter of the seventh embodiment differs from the IO adapter of the sixth embodiment shown in FIG. 20 in that a section of the management software is different. Also, compared to the management interface for setting the IO adapter of the fourth embodiment shown in FIG. 16, a means for setting the what LPAR to assign that capsule interface, has been added to the setter unit of each capsule interface of each IO adapter.

The following description centers on those sections differing from the fourth embodiment. As shown in FIG. 23, in the seventh embodiment, the management software 109 contains a VMM and a management interface 2302 for setting the IO adapter. The management interface 2302 contains IO adapter setter units 23031, and so on. All IO adaptors other than the IO adapter No. 1 are omitted from the drawing in FIG. 23. The IO adapter setter units 23031 contain capsule interface setter units 23041, 23042 for each capsule interface making up the corresponding IO adapter. The capsule interface setter units 23041, 23042 include: the respective capsule interface number display units 16051, 16052, the capsule interface identifier display units 16061, 16062, the protocol type setter units 16071, 16072, the bandwidth information setter units 16081, 16082, the priority level information setter units 16091, 16092, the path information setter units 16101, 16102, and the deletion setter units 16111, 16112. These units are the same for the management interfaces for setting the IO adapters in the fourth embodiment as shown in FIG. 16. In addition, the IO adapter of the seventh embodiment also contains assignment information for applicable LPAR setter units 23131, 23132, for setting what LPAR to assign the each capsule interface. These user interfaces allow making new assignments, changing assignments, and deleting assignments between the LPAR and the capsule interface.

Eighth Embodiment

Figure 24:
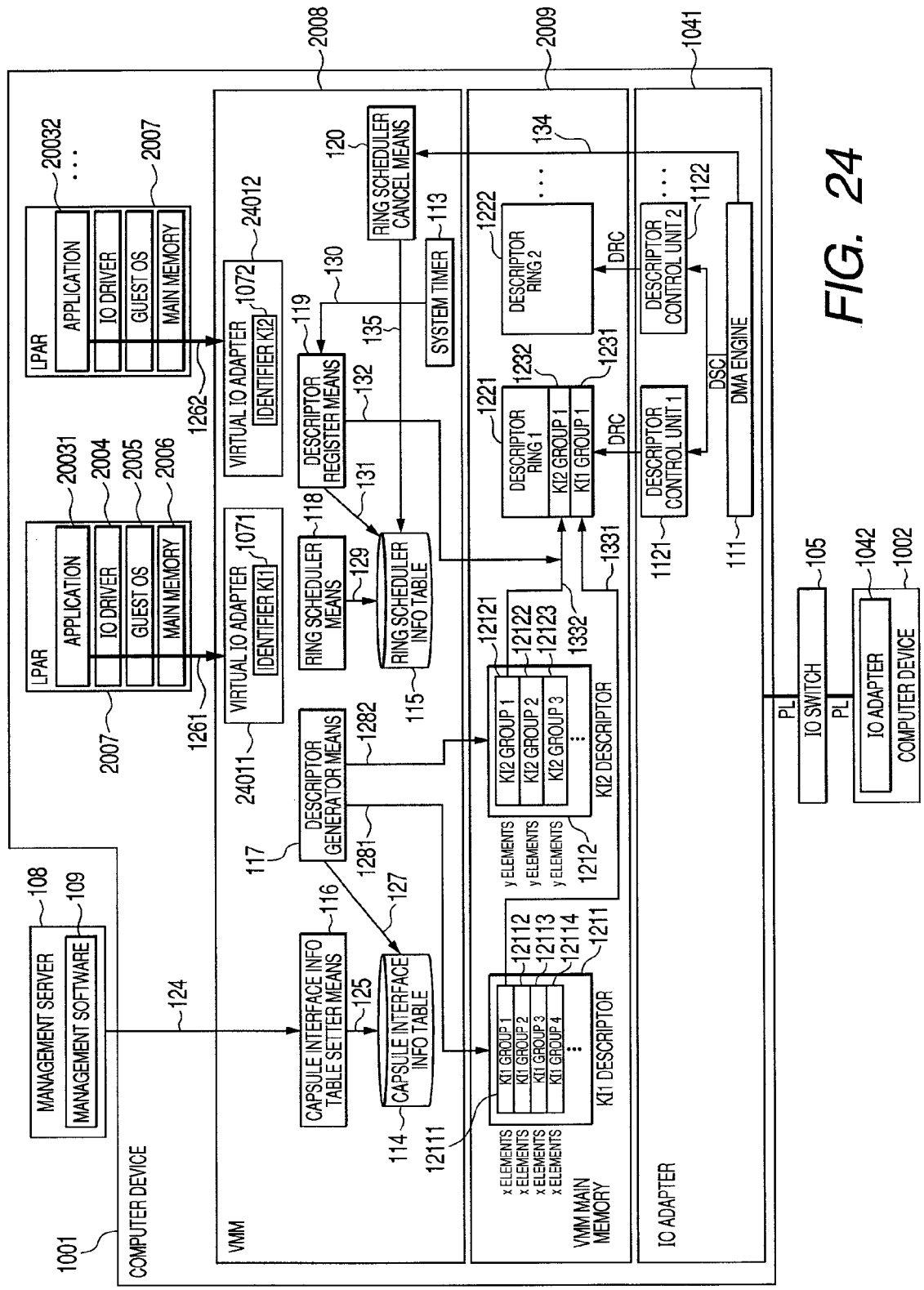
FIG. 24 is a block diagram of the IO adapter and the IO driver when applied to the VMM (Virtual Machine Monitor) of the eight embodiment of this invention.

The structure of the IO adapter of the eighth embodiment of this invention is described next while referring to FIG. 24. FIG. 24 is a block diagram of the IO adapter and the IO driver when applied to the VMM (Virtual Machine Monitor) of the eight embodiment of this invention. Compared to the structure of the IO adapter in the sixth embodiment shown in FIG. 20, the eighth embodiment differs in the point that the application programs 20031, 20032 do not retain the capsule interface identifiers KI1, KI2 (1071, 1072 in FIG. 20). The following description focuses on those sections differing from the sixth embodiment. As shown in FIG. 24, in the eighth embodiment, the VMM 2008 contains virtual IO adapters 24011, 24012 to emulate the IO adapter 1041 for each capsule interface. The IO driver 2004 on the LPAR 2007 can utilize the virtual IO adapters 24011, 24012 the same as a physical IO adapter 1041. The VMM 2008 decides the virtual IO adapters 24011, 24012 assignments on the LPAR 2007 so that a data transfer request to a specified virtual IO adapter 24011, 24012 is made when communicating by using capsule interfaces. In the eighth embodiment, instead of the application programs 20031, 20032, the virtual IO adapters 24011, 24012 retain the capsule interface identifiers KI1 1071 and KI2 1072. The communication bandwidth component can in this way be guaranteed when the virtual IO adapters 24011, 24012 jointly share the same physical wire. All other parts of the structure are identical to the sixth embodiment. In FIG. 24, the LPAR 2007 and the virtual IO adapters 24011, 24012 were shown in a 1-to-1 relationship however an N-to-M (N and M are any integer of 1 or more) relation is also allowable.

The invention rendered by the inventors was specifically described based on the embodiments. However, this invention is not limited by these embodiments and all types of changes and adaptations not departing from the spirit and scope of the invention are allowable.

The data transferring method for IO adapters in this invention is applicable to data transmission between information platform devices such as server devices, storage devices, and network switching devices.

What is claimed is:

1. Information platform equipment which provides an application program operated thereon with capsule interfaces serving as an interface to encapsulate desired communication protocols for data communication, comprising:

an IO driver including:

a capsule interface information setting means for generating, in response requests for generation of said capsule interfaces, capsule interface identifiers for identifying respective ones of said capsule interfaces, and for setting bandwidth information indicating a data transfer bandwidth assigned to each of said capsule interfaces identified by the capsule interface identifiers, respectively;

a descriptor generator means for generating, in response to a data transfer request from an application program, a respective capsule interface descriptor for each of said capsule interfaces, each capsule interface descriptor including a plurality of descriptors having data transfer control information for a corresponding capsule interface, and for arranging said plurality of descriptors into one or more descriptor groups within said capsule interface descriptors, wherein a number of said plurality of descriptors belonging to each of said descriptor groups is determined by said bandwidth information set respectively for each of said capsule interfaces;

a ring scheduler means for registering descriptor ring entries for said capsule interface descriptors into a ring scheduler information table, said entries being equal in number to a number of said plurality of descriptors consumed by the respective capsule interfaces at each predetermined cycle time and to the number of said plurality of descriptors belonging to each of said descriptor groups of respective ones of said capsule interface descriptors; and a descriptor registration means for copying descriptors belonging to one of said descriptor groups from each of said capsule interface descriptors, to a descriptor ring in accordance with information registered in the ring scheduler information table, said descriptor registration means being enabled at said each predetermined cycle time; and an IO adapter having a DMA engine and a descriptor control unit, and executing DMA data transfer between a main memory of the information platform equipment and the IO adapter in accordance with the descriptors copied to the descriptor ring.

2. The information platform equipment according to claim 1, wherein the IO driver further includes a bandwidth change means for changing, in response to a request for changing the data transfer bandwidth assigned to one of said capsule interfaces, the set bandwidth information in accordance with said request for changing, and for deleting information for the corresponding capsule interface set in the ring scheduler information table.

3. The information platform equipment according to claim 2, wherein said bandwidth change means includes means for requesting to said descriptor generator means to regroup the descriptors concerned with said capsule interface, and wherein said descriptor means re-groups said descriptors concerned with said capsule interface on the basis of the changed bandwidth information.

4. The information platform equipment according to claim 3, wherein said bandwidth change means includes means for issuing a request for re-registering the number of descriptor entries concerned with said capsule interface to said ring scheduler means, and wherein said ring scheduler means re-registers the number of descriptor entries in response to said request for re-registering.

5. The information platform equipment according to claim 1, wherein said IO driver further includes a capsule interface information table in which the capsule interface identifiers are set in correspondence with the bandwidth information for the capsule interfaces identified by the capsule interface identifiers.

6. The information platform equipment according to claim 5, wherein the capsule interface information table includes entries for storing priority level information indicating a priority level of data transfer for the capsule interfaces identified by the capsule interface identifiers, and wherein the ring scheduler means selects the descriptor ring from a plurality of descriptor rings in accordance with the priority level information set in said capsule interface information table.

7. The information platform equipment according to claim 6, wherein said number of said plurality of descriptors belonging to each of said descriptor groups is decided in accordance with data size of a data buffer specified by said plurality of descriptors, said each predetermined cycle time, and the bandwidth information so that the total data size of data buffers specified by descriptors belonging to one of said descriptor groups becomes less than or equal to the data size decided by the predetermined cycle time and the bandwidth information.

8. The information platform equipment according to claim 5, further comprising a virtual machine monitor to form a logical partition on which the application program is executed, and wherein said IO driver is included in said virtual machine monitor.

9. A data transfer method for information platform equipment an IO adapter which includes one or more DMA engines and one or more descriptor control unit, an IO driver for forming a descriptor ring in a main memory serving as a ring buffer for a capsule interface descriptor corresponding to a descriptor control unit and for providing an application program with one or more capsule interfaces serving as interfaces to encapsulate a desired communication protocol for data communication using the DMA engine, said method comprising the steps of:
  receiving a request for generating a capsule interface from management software;
  generating a capsule interface identifier for identifying the requested capsule interface;
  registering said capsule identifier and bandwidth information in a capsule interface information table, said bandwidth information indicating a data transfer bandwidth designated by said request for for assignment to said capsule interface;
  in response to a data transfer request from said application program, generating a capsule interface descriptor for said capsule interface, said capsule interface descriptor including a plurality of descriptors having data transfer control information for the capsule interface, and arranging said plurality of descriptors into one or more descriptor groups within said capsule interface descriptor;
  determining a number of said plurality of descriptors belonging to each of said descriptor groups on the basis of said bandwidth information;
  registering descriptor ring entries for said capsule interface descriptors into a ring scheduler information table, said entries being equal in number to a number of said plurality of descriptors consumed by the capsule interface at each predetermined cycle time and to the number of said plurality of descriptors belonging to each of said descriptor groups determined by said determining step;
  copying descriptors belonging to one of said descriptor groups to a descriptor ring in accordance with information registered in said ring scheduler information table; and
  executing DMA transfer in accordance with the plurality of descriptors copied to said descriptor ring.

10. The data transfer method according to claim 9, wherein said copying step and said executing step are repeated in a predetermined cycle until data transfer based on said plurality of descriptors is finished.

11. The data transfer method according to claim 10, wherein said step of generating a capsule interface identifier includes the step of notifying said management software of said generated capsule interface identifier.

12. The data transfer method according to claim 11, further comprising the step of:
  receiving, by the IO driver, a request for deleting said capsule interface from the management software;
  deleting information concerned with the capsule interface from the capsule interface information table; and
  notifying completion of deleting said capsule interface to the management software.

13. The data transfer method according to claim 11, further comprising the steps of:
  receiving, by the IO driver, a request for changing the data transfer bandwidth assigned to said capsule interface, said request for changing including a capsule interface identifier corresponding to said capsule interface and designation of the data transfer bandwidth;
  changing the bandwidth information corresponding to the capsule interface identifier on the basis of the designation of data transfer bandwidth;
  deleting information concerned with said capsule interface from the ring scheduler information table;
  re-determining the number of the plurality of descriptors on the basis of the changed bandwidth information; and
  re-registering the re-determined number into the ring schedule information.

* * * * *